(12) United States Patent
Lena et al.

(10) Patent No.: US 10,129,942 B2
(45) Date of Patent: Nov. 13, 2018

(54) ELECTRONIC CIRCUIT FOR DRIVING LED STRINGS SO AS TO REDUCE THE LIGHT FLICKER

(71) Applicant: STMicroelectronics S.r.l., Agrate Brianza (IT)

(72) Inventors: Davide Lena, Turin (IT); Simone Crespi, San Vero Milis (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 15/830,788

(22) Filed: Dec. 4, 2017

(65) Prior Publication Data

US 2018/0092168 A1 Mar. 29, 2018

Related U.S. Application Data

(63) Continuation of application No. 15/421,610, filed on Feb. 1, 2017, now Pat. No. 9,867,245, which is a
(Continued)

(51) Int. Cl.
*H05B 33/08* (2006.01)

(52) U.S. Cl.
CPC ....... *H05B 33/083* (2013.01); *H05B 33/0812* (2013.01); *H05B 33/0845* (2013.01); *H05K 999/99* (2013.01)

(58) Field of Classification Search
CPC ............ H05B 33/0815; H05B 33/0818; H05B 33/0884; H05B 33/0809; H05B 33/0848;
(Continued)

(56) References Cited

U.S. PATENT DOCUMENTS 6,989,807 B2 1/2006 Chiang
7,081,722 B1 * 7/2006 Huynh ............... H05B 33/0818
315/185 S
(Continued)

FOREIGN PATENT DOCUMENTS

EP 2645816 A1 10/2013
KR 20150015376 A 2/2015
WO WO-2014209009 A1 12/2014

OTHER PUBLICATIONS

2015 Microchip Technology Inc. Data Sheet CL8800, "Sequential Linear LED Driver," DS200053571, pp. 1-14.
(Continued)

*Primary Examiner* — Douglas W Owens
*Assistant Examiner* — Syed M Kaiser
(74) *Attorney, Agent, or Firm* — Crowe & Dunlevy

(57) ABSTRACT

LED strings cascaded to one another are driven by an electronic circuit that includes regulation modules and a brightness-compensation module. The regulation modules carry out in sequence a current-regulation phase, in which they regulate the current that flows in the corresponding LED strings. The regulation module includes: a compensation regulator coupled to a compensation LED string and to a capacitor and a generator that generates an electrical quantity indicating the luminous flux emitted by the LED strings and by the compensation LED string. The compensation regulator regulates a current that flows in the compensation LED string as a function of the electrical quantity, discharging the capacitor through the compensation LED string.

22 Claims, 9 Drawing Sheets

Related U.S. Application Data continuation-in-part of application No. 15/162,289, filed on May 23, 2016, now Pat. No. 9,730,285.

(58) Field of Classification Search
CPC ............ H05B 33/0896; H05B 37/0245; H05B 37/0254
USPC .................... 35/185 R, 224, 294, 307, 200 R
See application file for complete search history.

(56) References Cited

U.S. PATENT DOCUMENTS

| | | | |
|---|---|---|---|
| 7,233,115 B2 | 6/2007 | Lys | |
| 7,511,437 B2 | 3/2009 | Lys et al. | |
| 8,049,439 B2 | 11/2011 | Zhao et al. | |
| 8,288,960 B2 | 10/2012 | Chiang et al. | |
| 8,487,546 B2* | 7/2013 | Melanson | H05B 33/0815 315/291 |
| 8,521,035 B2* | 8/2013 | Knapp | H04L 12/43 315/158 |
| 8,742,682 B1 | 6/2014 | Wang et al. | |
| 9,000,674 B2 | 4/2015 | Lynch et al. | |
| 9,210,772 B2 | 12/2015 | Maiwald | |
| 2004/0135560 A1 | 7/2004 | Kernahan et al. | |
| 2007/0159421 A1* | 7/2007 | Peker | G09G 3/3413 345/82 |
| 2007/0267978 A1* | 11/2007 | Shteynberg | H05B 33/0818 315/247 |
| 2009/0058323 A1 | 3/2009 | Yang | |
| 2009/0230874 A1 | 9/2009 | Zhao et al. | |
| 2009/0230891 A1 | 9/2009 | Zhao et al. | |
| 2010/0156315 A1 | 6/2010 | Zhao et al. | |
| 2010/0164400 A1* | 7/2010 | Adragna | H02M 1/4225 315/294 |
| 2010/0194298 A1* | 8/2010 | Kuwabara | H05B 33/083 315/186 |
| 2010/0207534 A1* | 8/2010 | Dowling | H05B 33/0818 315/186 |
| 2010/0327764 A1* | 12/2010 | Knapp | H04L 12/43 315/250 |
| 2011/0169418 A1* | 7/2011 | Yang | H05B 33/0815 315/291 |
| 2011/0193489 A1* | 8/2011 | Moss | H05B 33/0818 315/210 |
| 2011/0227497 A1* | 9/2011 | Hu | H05B 33/0809 315/224 |
| 2011/0273102 A1* | 11/2011 | van de Ven | H05B 33/0809 315/193 |
| 2011/0292704 A1 | 12/2011 | Makino et al. | |
| 2012/0081009 A1* | 4/2012 | Shteynberg | H05B 33/083 315/122 |
| 2012/0154260 A1* | 6/2012 | Decraemer | H05B 33/0815 345/82 |
| 2012/0176066 A1 | 7/2012 | Lin et al. | |
| 2012/0200229 A1* | 8/2012 | Kunst | H05B 33/0815 315/186 |
| 2012/0217882 A1* | 8/2012 | Wong | F21V 23/0464 315/185 R |
| 2012/0326631 A1 | 12/2012 | Naruo et al. | |
| 2013/0257282 A1 | 10/2013 | Van Den Berg et al. | |
| 2013/0320850 A1 | 12/2013 | Nakamura | |
| 2013/0320880 A1* | 12/2013 | Walker | H05B 37/02 315/294 |
| 2014/0125235 A1 | 5/2014 | van den Berg et al. | |
| 2014/0126261 A1* | 5/2014 | Newman, Jr. | H02M 1/081 363/128 |
| 2014/0361696 A1* | 12/2014 | Siessegger | H05B 33/0803 315/186 |
| 2015/0264769 A1* | 9/2015 | Jelaca | H05B 33/0845 315/206 |

OTHER PUBLICATIONS 2014 iML Inc. (iNtegrated Memory Logic) Preliminary Specification iML8684, "Proprietary Technology Three Terminal Current Controller," 8684DOC rev 0.1, pp. 1-8.

2015 Maxic Technology Corporation, Data Sheet MT7605, "Segmented, Linear Constant-Current LED Driver," MT7605 Rev. 1.15, www.maxictech.com, pp. 1-7.

NXP GreenChip Objective Data Sheet, SSL6203TW, "120 V Mains Dimmable, 12 W Linear LED Driver," Rev. 1, Nov. 3, 2014, pp. 1-22.

Italian Search Report and Written Opinion for IT Appl. No. 102015000089452 dated Aug. 24, 2016 (8 pages).

IT Search Report and Written Opinion for IT Appl. No. 102016000044285 dated Dec. 21, 2016 (6 pages).

\* cited by examiner

ELECTRONIC CIRCUIT FOR DRIVING LED STRINGS SO AS TO REDUCE THE LIGHT FLICKER

CROSS-REFERENCE TO RELATED APPLICATIONS

This application is a continuation of U.S. application for patent Ser. No. 15/421,610 filed Feb. 1, 2017, which claims priority from Italian Patent Application No. 102016000044285, filed on Apr. 29, 2016, and further which is a continuation in part of U.S. application for patent Ser. No. 15/162,289 filed May 23, 2016, which claims priority from Italian Patent Application No. 102015000089452 filed Dec. 31, 2015. The disclosures of all of the foregoing applications are incorporated by reference.

TECHNICAL FIELD

The present invention relates to an electronic circuit for driving light emitting diode (LED) strings so as to reduce the so-called light flicker.

BACKGROUND

As is known, LED sources are increasingly widespread, since they are characterized, among other things, by a high energy efficiency and a low power consumption given the same brightness.

LED sources require driving circuits capable of supplying d.c. currents at a low voltage. For this reason, in the case where a LED source is to be supplied through the electric power grid, it is necessary to use, within the driving circuit, a switching converter, such as, for example, a converter of a buck, boost, or flyback type.

Use of switching converters is particularly indicated in the case of professional applications, i.e., in the case of applications in which the level of power required is relatively high (for example, higher than 50 W), and in which the constraints regarding the packaging and installation are not stringent. Instead, in the case of applications (for example) in the domestic field, the powers required are low, and integration in switching-converter driving circuits is problematic, since the constructional constraints for LED sources, for example as regards the corresponding plugs, are stringent.

As an alternative to the use of switching converters, less complex solutions have been proposed, also known as AC-LEDs. These solutions present some aspects in common, such as: the presence of a rectifier circuit; the presence of a plurality of LED strings, each string being formed by a corresponding number of LEDs connected in series; and the presence of one or more modules, which regulate the current that flows in the strings as a function of the value of the sinusoidal grid voltage. An example of driving circuit of an AC-LED type is described in European Patent No. 2645816 (incorporated by reference).

In greater detail, typically a driving circuit of an AC-LED type is configured in such a way that, as the sinusoidal grid voltage increases, the number of LED strings connected in series increases, and consequently the number of LEDs that are on. Further, as the number of on LEDs increases, the driving circuit increases the regulated current. More in particular, the current increments occur according to discrete levels; the current thus remains constant for a certain time interval, before rising to the next level. The number of current levels is equal to the number of LED strings.

This being said, driving circuits of the so-called AC-LED type are effectively characterized by a high constructional simplicity. However, they provide only discrete levels of performance as regards flicker of the visible radiation generated thereby, on account of the stepwise plot of the current. In this connection, traditionally light flicker is expressed via two quantities: flicker percent and flicker index. In particular, given one period of the supply voltage, the flicker percent is equal to $100 \cdot (A-B)/(A+B)$, where A and B are the maximum and minimum values of luminous flux, during the period. Instead, the flicker index is equal to $AREA_1 (AREA_1+AREA_2)$, where, given an area subtended by the curve that represents the luminous flux during a period of the supply voltage, $AREA_1$ is the portion of area that exceeds the mean value of the luminous flux in said period, whereas $AREA_2$ is the portion of area that is lower than said mean value. In the case of AC-LED systems, typically it is possible to obtain values of flicker index and flicker percent of, for example, 0.34 and 99%, respectively.

Since light flicker may be harmful for human health and further interferes with filming and photographing, it is desirable for it to be as low as possible. In order to reduce the flicker index, the U.S. Pat. No. 8,742,682 (incorporated by reference) suggests coupling the LED strings to capacitors with high values of capacitance (of the order of hundreds of microfarads). In this way, however, there occurs a reduction of the service life of the lamp, on account of the reduced service life of said capacitors, as well as a deterioration of other characteristic parameters of the AC-LED system, such as efficiency. In addition, the circuit proposed presents problems of integration.

There is a need in the art to provide an electronic driving circuit that will solve at least in part the foregoing drawbacks.

SUMMARY

In an embodiment, an electronic circuit is provided for driving a plurality of LED strings cascaded to one another and subjected to a rectified grid voltage. Each LED string forms a respective cathode terminal. The electronic circuit comprises: a plurality of regulation modules; and a brightness-compensation module. Each regulation module is configured to be coupled to the cathode terminal of a corresponding LED string, to a resistive element, and to a capacitor coupled to the resistive element and configured to be charged through at least one portion of a current that flows in the resistive element, said regulation modules being further configured to carry out in sequence a current-regulation phase, as a function of the evolution of the rectified grid voltage. Each regulation module is further configured so that, when said regulation module carries out the current-regulation phase, it regulates the current that flows in the corresponding LED string, in the previous LED strings, and in the resistive element. The brightness-compensation module comprises: a compensation regulator, which is coupleable to a compensation LED string, additional to said plurality of LED strings, and to the capacitor; and a first generator coupled to said plurality of regulation modules and to said compensation regulator and configured to generate a first electrical quantity indicating the luminous flux emitted by said plurality of LED strings and by the compensation LED string. The compensation regulator is configured to regulate a current that flows in the compensation LED string as a function of said first electrical quantity, discharging the capacitor through the compensation LED string.

BRIEF DESCRIPTION OF THE DRAWINGS

For a better understanding of the present invention, preferred embodiments thereof are now described, purely by way of non-limiting example with reference to the attached drawings, wherein.

DETAILED DESCRIPTION

Figure 1:
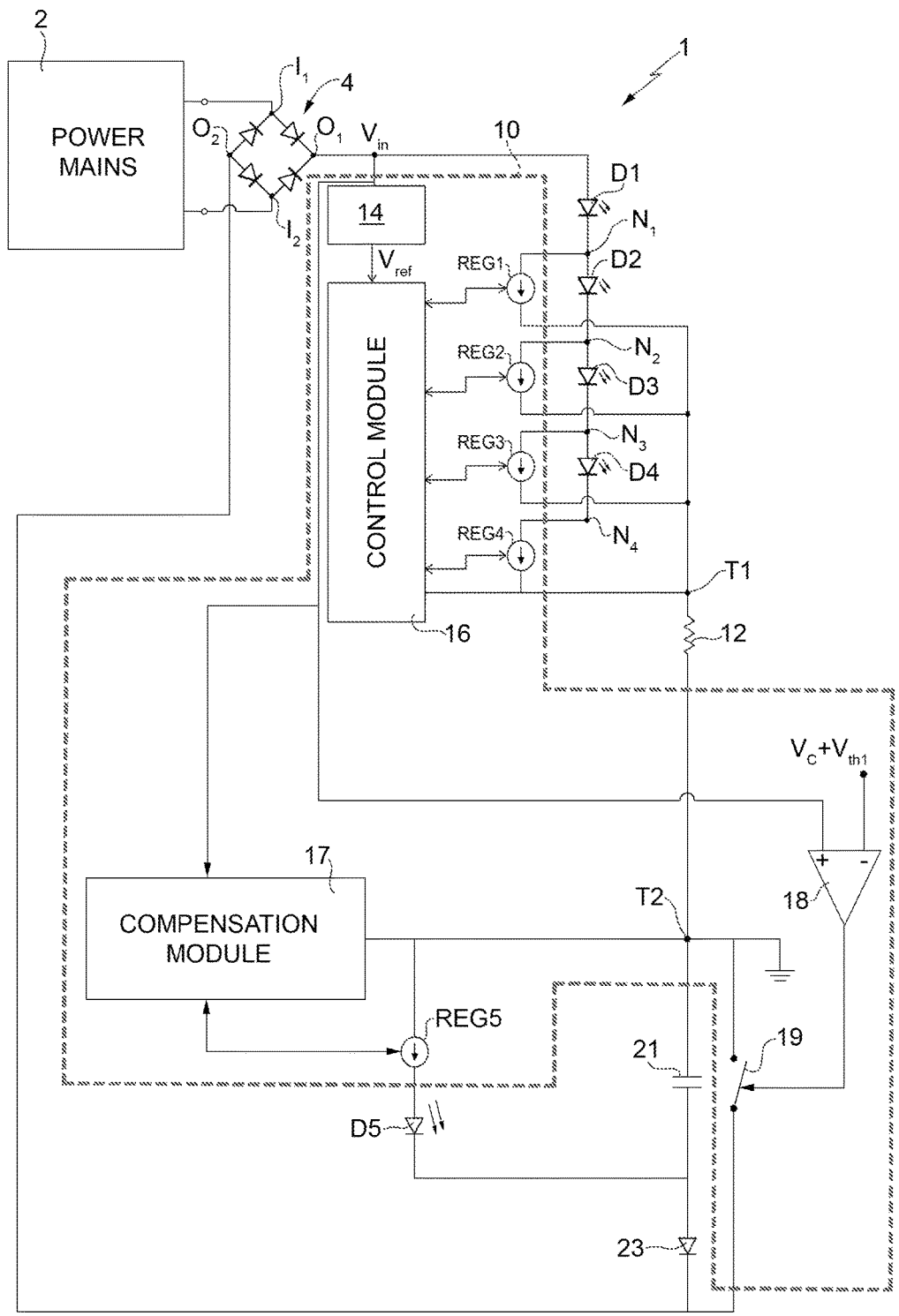
FIG. 1 shows a principle circuit diagram of an optoelectronic circuit including the present driving circuit.

FIG. 1 shows an optoelectronic circuit 1, which can be electrically coupled to the power grid 2 through a rectifier 4 formed, for example, by a rectifier of the diode-bridge type, also known as Graetz-bridge rectifier. In this connection, the rectifier 4 comprises a first input terminal $I_1$ and a second input terminal $I_2$, which are each connected to the power grid 2, and a first output terminal $O_1$ and a second output terminal $O_2$.

The optoelectronic circuit 1 further comprises a plurality of LED strings. Purely by way of example, the embodiment shown in FIG. 1 comprises a first LED string, a second LED string, a third LED string, and a fourth LED string, designated, respectively, by D1, D2, D3, and D4.

Each LED string is of a per se known type; consequently, albeit not shown in detail, each of the first, second, third, and fourth LED strings D1, D2, D3, and D4 may comprise a respective number of LEDs, connected together in series.

In general, the first, second, third, and fourth LED strings D1, D2, D3, and D4 may be different from one another. Further, each of the aforementioned LED strings forms a respective first terminal and a respective second terminal, which will be referred to hereinafter as the anode terminal and cathode terminal. In fact, each LED string is configured in such a way that it is traversed by a forward current from the respective anode terminal to the respective cathode terminal, only if the voltage present between the anode terminal and the cathode terminal exceeds a corresponding (positive) threshold voltage. In what follows, the threshold voltages of the first, second, third, and fourth LED strings D1, D2, D3, D4 will be referred to, respectively, as the first, second, third, and fourth threshold voltages $V_{th1}$, $V_{th2}$, $V_{th3}$, $V_{th4}$.

In greater detail, the anode terminal of the first LED string D1 is connected to the first output terminal $O_1$ of the rectifier 4. Further, the first, second, third, and fourth LED strings D1, D2, D3, D4 are cascaded in series to one another. In fact, the cathode terminal of the first LED string D1 forms a first node $N_1$, connected to which is the anode terminal of the second LED string D2. The cathode terminal of the second LED string D2 forms a second node $N_2$, connected to which is the anode terminal of the third LED string D3. The cathode terminal of the third LED string D3 forms a third node $N_3$, connected to which is the anode terminal of the fourth LED string D4. The cathode terminal of the fourth LED string D4 forms a fourth node $N_4$.

The optoelectronic circuit 1 further comprises an electronic driving circuit 10 and a resistor 12, which will be referred to hereinafter as the external resistor 12. The external resistor 12 has a resistance $R_{text}$, which is, for example, equal to 30Ω.

Figure 2:
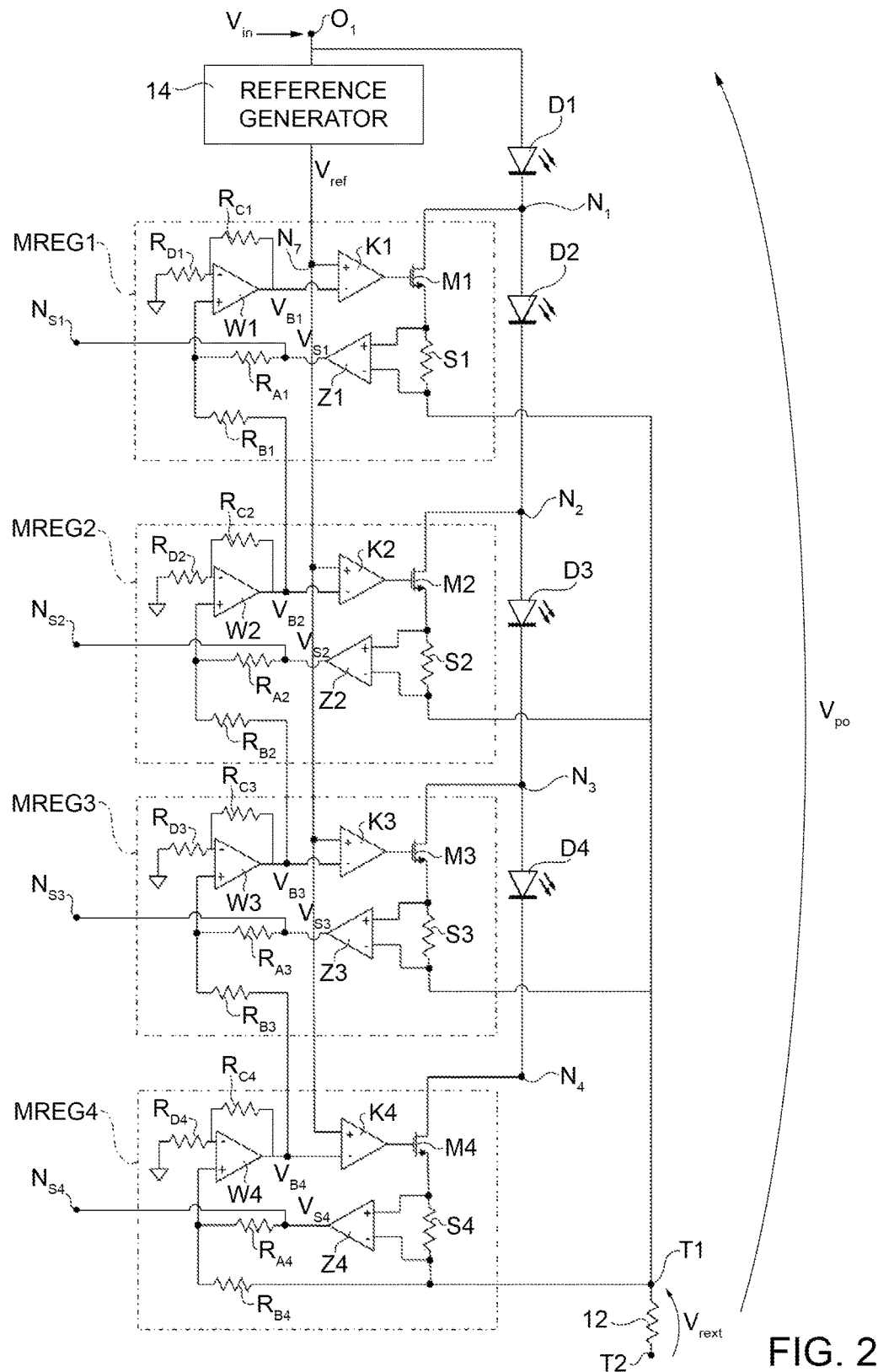
FIGS. 2 and 6 show respective circuit diagrams of a first part and second part of an embodiment of the present driving circuit.

In FIG. 1, the electronic driving circuit 10 is shown with a corresponding principle block diagram, instead of with the corresponding circuit diagram, which is represented in FIG. 2 and to which the reader is referred for the details of implementation. This being said, the electronic driving circuit 10 comprises a circuit module for generation of a reference electrical quantity, which will be referred to in what follows as the reference generator 14. Further, the electronic driving circuit 10 comprises a control module 16 and a first regulator REG1, a second regulator REG2, a third regulator REG3, and a fourth regulator REG4, which are driven by the control module 16 and supply to the latter quantities indicating currents regulated thereby. Further, each of the first, second, third, and fourth regulators REG1, REG2, REG3, REG4 has a respective first terminal and a respective second terminal. The first terminals of the first, second, third, and fourth regulators REG1, REG2, REG3, REG4 are connected, respectively, to the first, second, third, and fourth nodes $N_1$, $N_2$, $N_3$, $N_4$, whereas the respective second terminals are connected to a first terminal T1 of the external resistor 12, the second terminal T2 of which is connected to ground. Further, as shown qualitatively in FIG. 1, the first terminal T1 of the external resistor 12 is connected to the control module 16 for enabling a feedback control, as described in detail hereinafter.

FIG. 1 shows further, once again qualitatively, that the driving circuit 10 further comprises a compensation module 17, a fifth regulator REG5, a comparator 18, and a switch 19. Further, the optoelectronic circuit 1 comprises a fifth LED string D5, as well as a capacitor 21 and a diode 23, which will be referred to, respectively, as the compensation capacitor 21 and the compensation diode 23.

The compensation capacitor 21 has a value of capacitance of, for example, 15 g and is connected between the second terminal T2 of the external resistor 12 (i.e., ground) and the cathode of the compensation diode 23, the anode of which is connected to the second output terminal $O_2$ of the rectifier 4.

The compensation module 17 is electrically connected to the control module 16, by which it is controlled, as well as to the second terminal T2 of the external resistor 12. Further, the compensation module 17 is electrically connected to the fifth regulator REG5 for controlling the latter. In turn, the fifth regulator REG5 has a first terminal and a second terminal, which are respectively connected to the second terminal T2 of the external resistor 12 and to the anode of the fifth LED string D5, the cathode of which is connected to the anode of the compensation diode 23; further, the fifth regulator REG5 is designed to regulate the current that flows in the fifth LED string D5 and supplies to the compensation module 17 a quantity indicating said current.

The switch 19 is connected between the second terminal T2 of the external resistor 12 (i.e., ground) and the second output terminal $O_2$ of the rectifier 4 (and the cathode of the compensation diode 23). Further, when the switch 19 is closed, it connects the second output terminal $O_2$ of the rectifier 4 and the cathode of the compensation diode 23 to ground.

For reasons that will be clarified hereinafter, the switch 19 is driven by the comparator 18, the positive input terminal of which is connected to the first output terminal $O_1$ of the rectifier 4. The negative input terminal of the comparator 18 is, instead, set at a voltage $V_C+V_{th1}$, where $V_C$ is the voltage drop on the compensation capacitor 21. As described in greater detail hereinafter, present, in use, on the first output terminal $O_1$ of the rectifier 4 is a voltage $V_{in}$; further, the comparator 18 is configured in such a way as: i) to close the switch 19, when the voltage $V_1$ is lower than the voltage $V_C+V_{th1}$; and ii) to open the switch 19, when the voltage $V_1$ is higher than the voltage $V_C+V_{th1}$. Without any loss of generality, the comparator 18 may comprise a reducer stage (not shown) designed to divide the voltages $V_1$ and $V_C+V_{th1}$ by a same reduction factor in such a way that the comparison can be carried out on the divided voltages.

Figure 3:
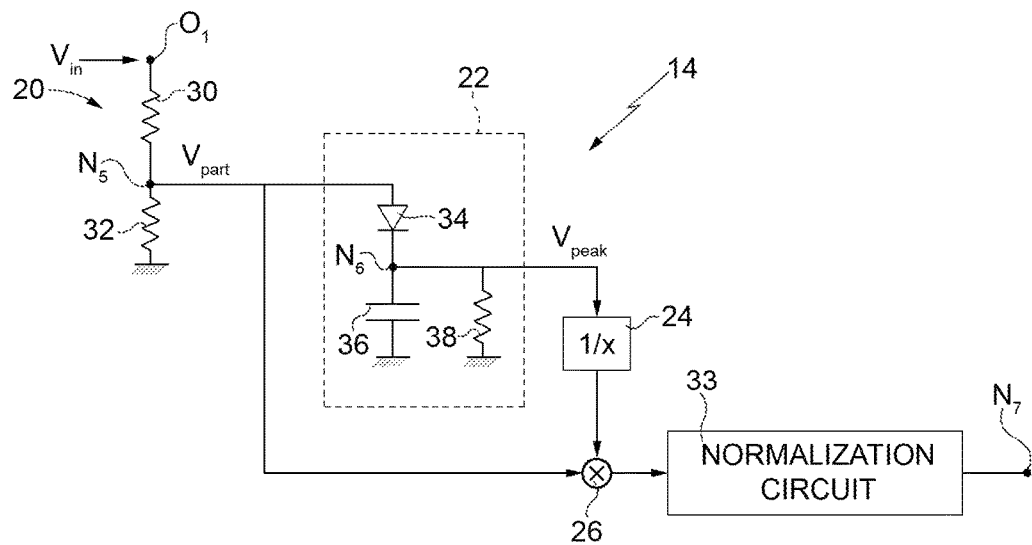
FIG. 3 shows a circuit diagram of a circuit designed to generate a reference voltage.

As shown in greater detail in FIG. 3, the reference generator 14 comprises a voltage divider 20, a peak detector 22, a divider 24, a multiplier 26, and a normalization circuit 33.

The voltage divider 20 comprises a pair of resistors 30, 32, which will be referred to hereinafter as the first and second dividing resistors 30, 32. The first terminal of the first dividing resistor 30 is connected to the first output terminal $O_1$ of the rectifier 4, whereas the second terminal of the first dividing resistor 30 is connected to the first terminal of the second dividing resistor 32, with which it forms a fifth node $N_5$. The second terminal of the second dividing resistor 32 is connected to ground.

The peak detector 22 comprises a diode 34, the anode of which is connected to the fifth node $N_5$, and the cathode of which forms a sixth node $N_6$. The peak detector 22 further comprises a capacitor 36 and a resistor 38, which will be referred to in what follows as the output resistor 38; the capacitor 36 and the output resistor 38 are connected in parallel between the sixth node $N_6$ and ground. In practice, the anode of the diode 34 and the sixth node $N_6$ form, respectively, the input and the output of the peak detector 22.

The divider 24 is formed by an electronic circuit of a per se known type (not described in detail), which is designed to generate, on its own output, a voltage signal equal to 1/x, where x is a voltage signal present on its own input, as described in greater detail hereinafter. The input of the divider 24 is connected to the output of the peak detector 22.

The multiplier 26 is formed by a corresponding electronic circuit of a per se known type (not described in detail), which includes a first input and a second input and is designed to generate on its own output a voltage signal equal to the product of the voltage signals present on its own first and second inputs. For example, albeit not shown, the multiplier 26 may be formed by a so-called Gilbert multiplier. In this case, the divider 24 and the multiplier 26 may be implemented with a single circuit diagram. Further, the first and second inputs of the multiplier 26 are connected, respectively, to the fifth node $N_5$ and to the output of the divider 24. The output of the multiplier 26 is connected to the input of the normalization circuit 33, the output of which forms a seventh node $N_7$. In turn, the seventh node $N_7$ forms the output of the reference generator 14.

Figure 4:
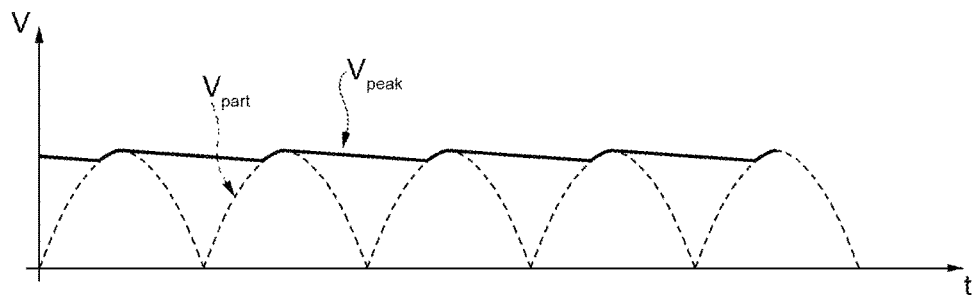
FIG. 4 shows examples of time plots of signals generated in the circuit shown in FIG. 3.

As mentioned previously, present on the first output terminal $O_1$ of the rectifier 4, and thus at input to the reference generator 14, is the voltage $V_{in}$, which is formed by a double-halfwave rectified sinusoidal voltage and is in phase with the voltage supplied by the power grid 2. On the fifth node $N_5$ a voltage $V_{part}$ is thus present, which is equal to $k \cdot V_{in}$, where k is the division ratio introduced by the voltage divider 20, which may, for example, be 0.0067. Further, on the sixth node $N_6$, and thus at output from the peak detector 22, a voltage $V_{peak}$ is present, which is a rectified voltage and has a plot of the type shown in FIG. 4. For simplicity, for the purposes of the present description, it is assumed that the voltage $V_{peak}$ is constant and equal to the peak value of the voltage $V_{part}$.

The divider 24 generates a voltage equal to $1/V_{peak}$, whereas at output from the multiplier 26 a voltage equal to $V_{part}/V_{peak}$ is present. Further, the normalization circuit 33 is of a per se known type and is configured to supply on its own output, i.e., on the seventh node $N_7$, a voltage $V_{ref}=V_{part}/V_{peak} \cdot V_{nomin}$, which will be referred to in what follows as the reference voltage $V_{ref}$. In greater detail, $V_{nomin}$ is, for example, equal to 2.1 V.

In practice, the reference voltage $V_{ref}$ supplied by the reference generator 14, has the waveform of a double-halfwave rectified sinusoid, in phase with the voltage $V_{in}$ and with an amplitude normalized with respect to the peak value assumed by the voltage $V_{in}$ itself, in such a way that, when the voltage $V_{in}$ has a maximum, the reference voltage $V_{ref}$ is equal to $V_{nomin}$. Consequently, the amplitude of the reference voltage $V_{ref}$ is substantially independent of possible variations of amplitude of the voltage $V_{in}$, which are caused, for example, by fluctuations of the voltage supplied by the power grid 2. Consequently, the amplitude of the reference voltage $V_{ref}$ is independent of the effective peak value of the voltage $V_{in}$. For simplicity, in the sequel there is assumed, except where otherwise specified, operation in nominal conditions, i.e., in the presence of an ideal power grid; in these conditions it may be assumed that $V_{ref}=k \cdot V_{in}$.

Once again with reference to the electronic driving circuit 10, it comprises a plurality of regulation modules, as shown in detail in FIG. 2. In particular, in the embodiment represented in FIG. 2 a first regulation module MREG1, a second regulation module MREG2, a third regulation module MREG3, and a fourth regulation module MREG4 are present, which are electrically connected together in sequence, as described hereinafter.

In detail, the first regulation module MREG1 comprises a first operational amplifier and a second operational amplifier, designated, respectively, by K1 and W1, as well as a MOSFET M1 and a resistor S1, which will be referred to in what follows as the sensing resistor S1. For example, the MOSFET M1 is of the N-channel enhancement type.

In greater detail, the drain terminal of the MOSFET M1 is connected to the first node $N_1$, whereas the source terminal is connected to the first terminal of the sensing resistor S1, the second terminal of which is connected to the first terminal T1 of the external resistor 12, the second terminal T2 of which, as has been said previously, is connected to ground.

The gate terminal of the MOSFET M1 is connected to the output terminal of the first operational amplifier K1; the MOSFET M1 is thus driven by the first operational amplifier K1. The positive input terminal of the first operational amplifier K1 is connected to the seventh node $N_7$, i.e., to the output of the reference generator 14, to be set, in use, at the reference voltage $V_{ref}$. The negative input terminal of the first operational amplifier K1 is connected to the output terminal of the second operational amplifier W1, which in use generates a voltage $V_{B1}$, which will be referred to in what follows as the feedback voltage $V_{B1}$.

The first regulation module MREG1 further comprises another four resistors, which will be referred to in what follows as the first, second, third, and fourth adder resistors $R_{A1}$, $R_{B1}$, $R_{C1}$, $R_{D1}$; further, the first regulation module MREG1 comprises a differential amplifier Z1.

In greater detail, the differential amplifier Z1 is of a per se known type and comprises a respective positive input terminal and a respective negative input terminal, which are respectively connected to the first and second terminals of the sensing resistor S1. In use, the differential amplifier Z1 generates on its own output (designated by $N_{S1}$) a voltage $V_{S1}$, which will be referred to in what follows as the detected voltage $V_{S1}$. The detected voltage $V_{S1}$ is directly proportional to the current that flows in the sensing resistor S1, and thus to the current that flows in the MOSFET M1.

Figure 5:
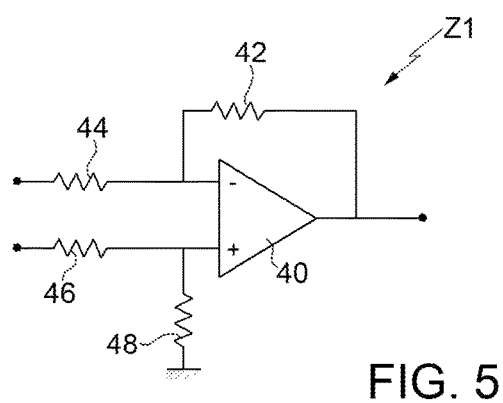
FIG. 5 shows a circuit diagram of a differential amplifier.

Purely by way of example, the differential amplifier Z1 may be formed as shown in FIG. 5. In this case, the differential amplifier Z1 comprises a respective operational amplifier 40 and four corresponding resistors, which will be referred to hereinafter as the first, second, third, and fourth additional resistors 42, 44, 46, 48. The first additional resistor 42 is connected between the output terminal and the negative input terminal of the operational amplifier 40. The second additional resistor 44 has a first terminal connected to the negative input terminal of the operational amplifier 40, whereas the respective second terminal forms the negative input terminal of the differential amplifier Z1; thus, it is connected to the second terminal of the sensing resistor S1. The third additional resistor 46 has a first terminal connected to the positive input terminal of the operational amplifier 40, whereas the respective second terminal forms the positive input terminal of the differential amplifier Z1; thus, it is connected to the first terminal of the sensing resistor S1. The fourth additional resistor 48 is connected between the positive input terminal of the operational amplifier 40 and ground. By selecting in a per se known manner the values of resistance of the first, second, third, and fourth additional resistors 42, 44, 46, 48 it is thus possible to set the gain (for example, a unit gain) between the voltage across the input terminals of the differential amplifier Z1 and the detected voltage $V_{S1}$, generated on the output terminal of the differential amplifier Z1. Ideally, the differential amplifier Z1 has a common-mode rejection ratio (CMRR) that is infinite.

Once again with reference to FIG. 2, the second operational amplifier W1 forms an adder circuit, together with the first, second, third, and fourth adder resistors $R_{A1}$, $R_{B1}$, $R_{C1}$, $R_{D1}$. In particular, the third adder resistor $R_{C1}$ is connected between the negative input terminal and the output terminal of the second operational amplifier W1. The fourth adder resistor $R_{D1}$ is connected between the negative input terminal of the second operational amplifier W1 and ground. The first and second terminals of the first adder resistor $R_{A1}$ are connected to the positive input terminal of the second operational amplifier W1 and to the output terminal of the differential amplifier Z1, respectively. The first terminal of the second adder resistor $R_{B1}$ is connected to the positive input terminal of the second operational amplifier W1, whereas the second terminal of the second adder resistor $R_{B1}$ is connected to the second regulation module MREG2, as described hereinafter.

In practice, the aforementioned adder circuit and the first operational amplifier K1 form, respectively, a first control circuit and a second control circuit of a control stage designed to control the MOSFET M1.

From a qualitative standpoint, the MOSFET M1, the sensing resistor S1, and the first operational amplifier K1 perform the function of the first regulator REG1. Further, once again qualitatively, the differential amplifier Z1 and the adder circuit formed by the second operational amplifier W1 perform part of the functions of the control module 16.

The second, third, and fourth regulation modules MREG2, MREG3, MREG4 are the same as the first regulation module MREG1, but for the differences described hereinafter. Further, given any one of the second, third, and fourth regulation modules MREG2, MREG3, MREG4, the respective electronic components and the voltages generated are denoted by the same terms used for the corresponding electronic components/voltages of the first regulation module MREG1, as well as by the same references, but for the fact that, given any component or voltage of the n-th regulation module, the corresponding reference ends with the number 'n', instead of with the number '1'. For this reason, the MOSFET, the first and second operational amplifiers, the differential amplifier, the sensing resistor, the feedback voltage, the detected voltage, and the first, second, third, and fourth adder resistors of the second regulation module MREG2 are designated, respectively, by M2, K2, W2, Z2, S2, $V_{B2}$, $V_{S2}$, $R_{A2}$, $R_{B2}$, $R_{C2}$, $R_{D2}$; likewise, the corresponding components/voltages of the third regulation module MREG3 are designated, respectively, by M3, K3, W3, Z3, S3, $V_{B3}$, $V_{S3}$, $R_{A3}$, $R_{B3}$, $R_{C3}$, $R_{D3}$; finally, the corresponding components/voltages of the fourth regulation module MREG4 are designated, respectively, by M4, K4, W4, Z4, S4, $V_{B4}$, $V_{S4}$, $R_{A4}$, $R_{B4}$, $R_{C4}$, $R_{D4}$. The detected voltages $V_{S2}$, $V_{S3}$, $V_{S4}$ are available, respectively, on the outputs of the differential amplifiers Z2, Z3, Z4, which are designated, respectively, by $N_{S2}$, $N_{S3}$, and $N_{S4}$.

Once again with reference to the first regulation module MREG1, the aforementioned second terminal of the second adder resistor $R_{B1}$ is connected to the output terminal of the second operational amplifier W2 of the second regulation module MREG2 for receiving the feedback voltage $V_{B2}$ generated by the latter. Further, the resistance of the first adder resistor $R_{A1}$ is greater than the resistance of the second adder resistor $R_{B1}$, in such a way that $V_{B1}=g1 \cdot V_{S1}+g2 \cdot V_{B2}$, with g2>g1, for reasons that will be clarified hereinafter.

Once again with reference to the first regulation module MREG1, the sensing resistor S1 may have a resistance lower than the resistance $R_{rext}$ of the external resistor 12; for example, the resistance of the sensing resistor S1 may be equal to one thirtieth of the resistance $R_{rext}$.

Purely by way of example, the sensing resistor Si may have a resistance of, for example, 1Ω. The first and second adder resistors $R_{A1}$, $R_{B1}$ may have resistances of, for example, 10 kΩ and 9.8 kΩ, respectively; further, the third and fourth adder resistors $R_{C1}$, $R_{D1}$ may have resistances of 10 kΩ. In this case, to a first approximation g1=1 and g2=1.01. More in general, the gains g2 and g1 may be close to 1; for example, there may apply the relations g1=1 and g2=1+Δ, where Δ is comprised, for example, between 0.01 and 0.1. In addition, the differential amplifier Z1 may be configured to amplify the voltage drop on the sensing resistor S1 with a gain equal to unity. In this case, the first, second, third, and fourth additional resistors 42, 44, 46, 48 may, for example, be the same as one another and, for example, be equal to 10 kΩ. Once again purely by way of example, the first, second, third, and fourth threshold voltages $V_{th1}$, $V_{th2}$, $V_{th3}$, $V_{th4}$ may be approximately 110 V, 78 V, 60 V, and 40 V, respectively.

As regards the second regulation module MREG2, the drain terminal of the respective MOSFET M2 is connected to the second node $N_2$. Further, the second terminal of the second adder resistor $R_{B2}$ is connected to the output terminal of the second operational amplifier W3 of the third regulation module MREG3 for receiving the feedback voltage $V_{B3}$ generated by the latter.

As regards the third regulation module MREG3, the drain terminal of the respective MOSFET M3 is connected to the third node $N_3$. Further, the second terminal of the second adder resistor $R_{B3}$ is connected to the output terminal of the second operational amplifier W4 of the fourth regulation module MREG4 for receiving the feedback voltage $V_{B4}$ generated by the latter.

As regards the fourth regulation module MREG4, the drain terminal of the respective MOSFET M4 is connected to the fourth node $N_4$. Further, the second terminal of the second adder resistor $R_{B4}$ is connected to the second terminal of its own sensing resistor S4, and thus to the first terminal of the external resistor 12, on which in use there is a voltage drop $V_{rext}$.

In practice, the positive input terminals of the first operational amplifiers K1, K2, K3, K4 of the first, second, third, and fourth regulation modules MREG1, MREG2, MREG3, and MREG4 are connected to the output of the reference generator 14 and receive the reference voltage $V_{ref}$. Instead, the negative input terminals of the first operational amplifiers K1, K2, K3, K4 receive the corresponding feedback voltages $V_{B1}$, $V_{B2}$, $V_{B3}$, $V_{B4}$, which are a function, among other things, of the corresponding detected voltages $V_{S1}$, $V_{S2}$, $V_{S3}$, $V_{S4}$. Further, as regards any one of the first, second, and third regulation modules MREG1, MREG2, MREG3, the corresponding feedback voltage is further a function of the feedback voltage generated by the subsequent regulation module. In particular, the feedback voltages $V_{B1}$, $V_{B2}$, $V_{B3}$ are, respectively, a function of the feedback voltages $V_{B2}$, $V_{B3}$, $V_{B4}$. As regards the fourth regulation module MREG4, the feedback voltage $V_{B4}$ is a function not only of the respective detected voltage $V_{S4}$, but also of the voltage drop $V_{rext}$ on the external resistor 12. On the other hand, since, as explained previously, the feedback voltages $V_{B1}$, $V_{B2}$, $V_{B3}$ are, respectively, a function of the feedback voltages $V_{B2}$, $V_{B3}$, $V_{B4}$, also the feedback voltages $V_{B1}$, $V_{B2}$, $V_{B3}$ depend upon the voltage $V_{rext}$ drop on the external resistor 12.

Figure 6:
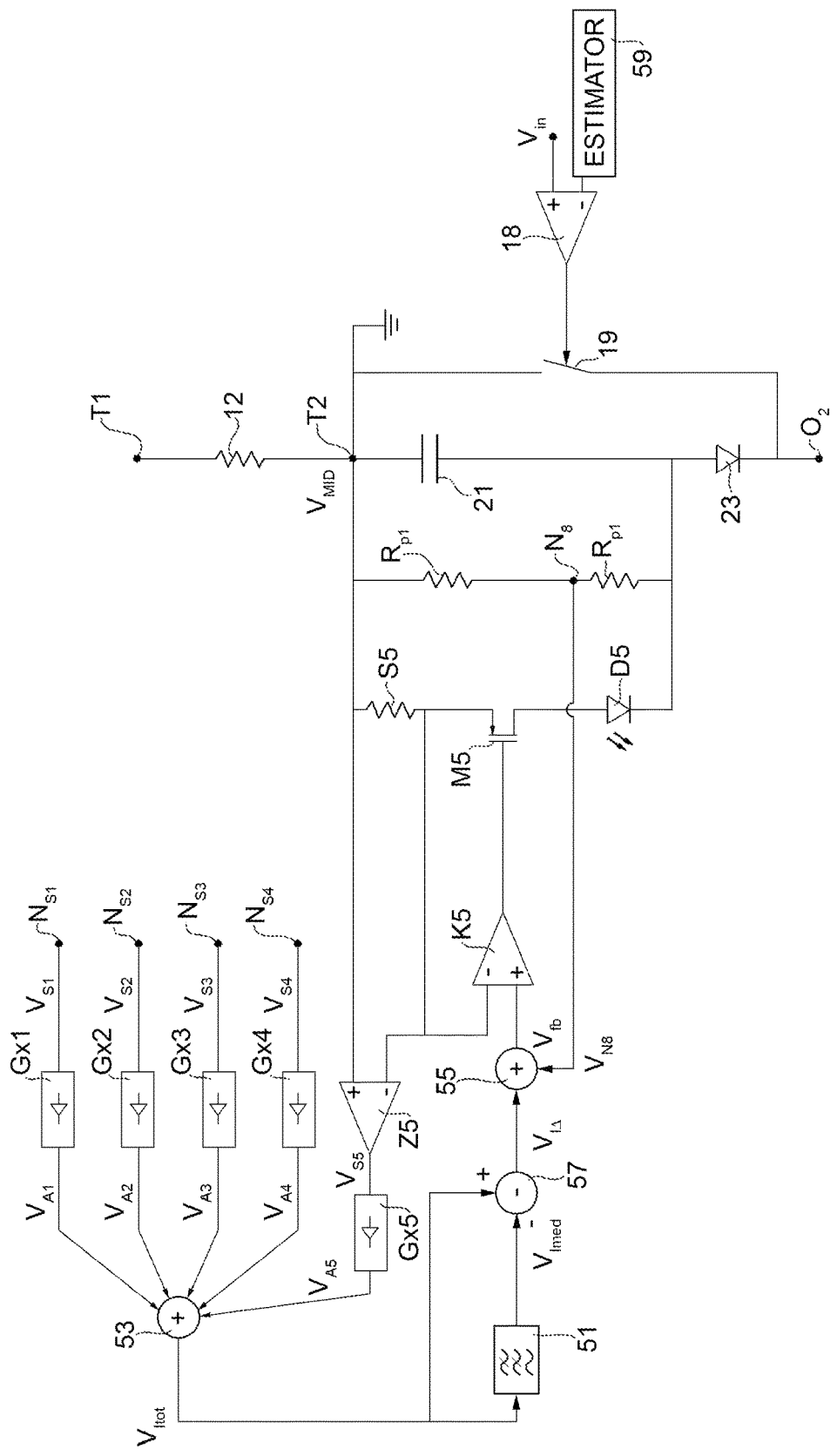

As shown in FIG. 6, the electronic driving circuit 10 further comprises a first gain circuit Gx1, a second gain circuit Gx2, a third gain circuit Gx3, and a fourth gain circuit Gx4, the inputs of which are connected, respectively, to the outputs Ns1, Ns2, Ns3, Ns4 of the differential amplifiers Z1, Z2, Z3, Z4 of the first, second, third, and fourth regulation modules MREG1, MREG2, MREG3, MREG4 for receiving, respectively, the detected voltages $V_{S1}$, $V_{S2}$, $V_{S3}$, $V_{S4}$.

In detail, the first, second, third, and fourth gain circuits Gx1, Gx2, Gx3, Gx4 introduce respectively gains gx1, gx2, gx3, gx4, in such a way that, on the respective outputs, the amplified voltages $V_{A1}$, $V_{A2}$, $V_{A3}$, $V_{A4}$, respectively, are present; there further apply the relations $V_{A1}=gx1 \cdot V_{S1}$, $V_{A2}=gx2 \cdot V_{S2}$, $V_{A3}=gx3 \cdot V_{S3}$, and $V_{A4}=gx4 \cdot V_{S4}$. In addition, in what follows it is assumed, for simplicity, that each of the first, second, third, and fourth LED strings D1, D2, D3, D4 is formed by a number NUM of LEDs, and further that gx1=1, gx2=2, gx3=3, gx4=4, for reasons that will be clarified hereinafter.

The electronic driving circuit 10 further comprises: a fifth gain circuit Gx5, a filter 51 of a low-pass type, a first adder stage 53 and a second adder stage 55, a subtractor stage 57, and a MOSFET M5, as well as a respective differential amplifier Z5 and a respective operational amplifier K5, which will be referred to, respectively, as the MOSFET M5 of the compensation module 17, the differential amplifier Z5 of the compensation module 17, and the operational amplifier K5 of the compensation module 17. Further, the electronic driving circuit 10 comprises three resistors S5, $R_{p1}$, $R_{p2}$, which will be referred to, respectively, as the sensing resistor S5 of the compensation module 17 and the first and second control resistors $R_{p1}$, $R_{p2}$.

In detail, a first terminal of the first control resistor $R_{p1}$ is connected to the second terminal T2 of the external resistor 12, i.e., to ground, whereas the second terminal of the first control resistor $R_{p1}$ is connected to a first terminal of the second control resistor $R_{p2}$, with which it forms an eighth node $N_8$. The second terminal of the second control resistor $R_{p2}$ is connected to the anode of the compensation diode 23.

The MOSFET M5 of the compensation module 17 is, for example, of the P-channel enhancement type. Further, the first and second terminals of the sensing resistor S5 are connected, respectively, to the second terminal T2 of the external resistor 12 and to the source terminal of the MOSFET M5 of the compensation module 17, the drain terminal of which is connected to the anode of the fifth LED string D5. The cathode of the fifth LED string D5 is connected to the anode of the compensation diode 23.

The positive input and the negative input of the differential amplifier Z5 of the compensation module 17 are connected, respectively, to the first and second terminals of the sensing resistor S5 of the compensation module 17, in such a way that, in use, the differential amplifier Z5 generates on its own output a detected voltage $V_{S5}$, which is directly proportional to the current that flows in the sensing resistor S5 of the compensation module 17, and thus to the current that flows in the MOSFET M5.

The output of the differential amplifier Z5 of the compensation module 17 is connected to the input of the fifth gain circuit Gx5, which introduces a gain gx5. In what follows, it is assumed, for reasons described hereinafter, that the fifth LED string D5 is formed by a number of LEDs equal to 4·NUM, i.e., equal to the total number of LEDs of the first, second, third, and fourth LED strings D1, D2, D3, D4; all the LEDs are, for example, the same as one another. It is further assumed that gx5=4.

On the output of the fifth gain circuit Gx5 an amplified voltage $V_{A5}=gx5 \cdot V_{S5}$ is present. Further, the outputs of the first, second, third, fourth, and fifth gain circuits Gx1, Gx2, Gx3, Gx4, Gx5 are connected to corresponding inputs of the first adder stage 53, the output of which is connected to the input of the filter 51 and to a first input of the subtractor stage 57, a second input of which is connected to the output of the filter 51.

The output of the subtractor stage 57 is connected to a first input of the second adder stage 55, a second input of which is connected to the eighth node $N_8$.

The positive input of the operational amplifier K5 of the compensation module 17 is connected to the output of the subtractor stage 57, whereas the negative input is connected to the negative input of the differential amplifier Z5, and thus to the second terminal of the sensing resistor S5. The output of the operational amplifier K5 is connected to the gate terminal of the MOSFET M5.

From a qualitative standpoint, the MOSFET M5, the sensing resistor S5, and the operational amplifier K5 perform the function of the fifth regulator REG5. Further, the first, second, third, fourth, and fifth gain circuits Gx1, Gx2, Gx3, Gx4, Gx5, the filter 51, the first and second adder stages 53, 55, the subtractor stage 57, the differential amplifier Z5, and the first and second control resistors $R_{p1}$, $R_{p2}$ form the compensation module 17.

As shown once again in FIG. 6, the electronic driving circuit 10 further comprises an estimator circuit 59, which is designed to supply on its own output a voltage equal to the voltage $V_C+V_{th1}$, divided by the aforementioned reduction factor; the output of the estimator circuit 59 is connected to the negative input of the comparator 18. The estimator circuit 59 is described in detail hereinafter. In general, however, since the reduction factor is introduced already by the estimator circuit 59, the comparator 18 does not apply further the reduction factor on the voltage present on its own negative input, but rather it applies it only on the voltage present on its own positive input.

Operation of the electronic driving circuit 10 is now described in detail. In order to facilitate understanding, initially the description is limited to a portion of the electronic driving circuit 10 that includes the control module 16 and the first, second, third, and fourth regulators REG1, REG2, REG3, REG4; this portion is described with reference to FIG. 7. From another standpoint, the behavior of the electronic driving circuit 10 is initially described assuming that the switch 19 is closed and that the compensation module 17, the fifth regulator REG5, the fifth LED string D5, and the compensation capacitor 21 and the compensation diode 23 are absent.

This being said, it is assumed that at a first instant $t_1$ the reference voltage $V_{ref}$ is zero and that then there follows an ascending portion of the respective profile of the double-halfwave rectified sinusoid.

At the first instant $t_1$ there cannot flow current in any of the LED strings. The voltage drop $V_{rext}$ on the external resistor 12, the detected voltages $V_{S1}$, $V_{S2}$, $V_{S3}$, $V_{S4}$, and the feedback voltages $V_{B1}$, $V_{B2}$, $V_{B3}$, $V_{B4}$ are thus zero. Consequently, each of the first operational amplifiers K1, K2, K3, K4 of the first, second, third, and fourth regulation modules MREG1, MREG2, MREG3, MREG4 are in positive saturation, since the voltage on the respective positive input terminal (which is equal to the reference voltage $V_{ref}$) exceeds the voltage present on the respective negative input terminal (which is zero).

Figure 7:
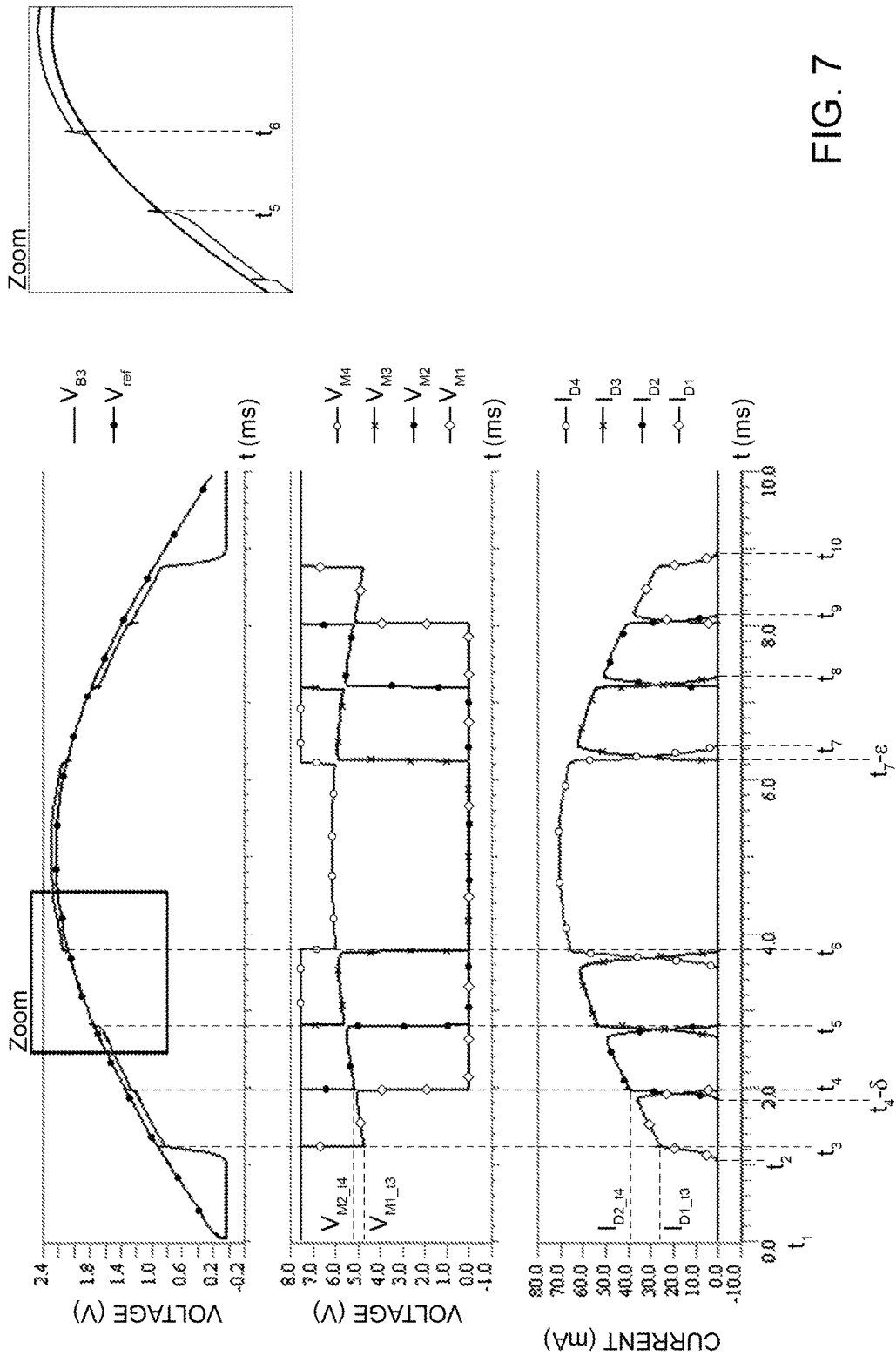
FIG. 7 shows time plots of voltages and currents generated in an embodiment of the present electronic driving circuit.

In other words, if $V_{M1}$, $V_{M2}$, $V_{M3}$, $V_{M4}$ are the voltages (shown in FIG. 7) present on the respective output terminals of the first operational amplifiers K1, K2, K3, K4 of the first, second, third, and fourth regulation modules MREG1, MREG2, MREG3, MREG4, at the first instant $t_1$ said voltages are equal to a maximum value (which, in the example shown in FIG. 7, is approximately 7.5 V). Consequently, the MOSFETs M1, M2, M3, M4 of the first, second, third, and fourth regulation modules MREG1, MREG2, MREG3, MREG4 operate in a saturation region and may be considered as corresponding short circuits.

Next, the increase in voltage $V_{in}$ leads the latter to approximate the first threshold voltage $V_{th1}$ of the first LED string D1. Consequently, at a subsequent second instant $t_2$, a current starts to flow in the first LED string D1, but not in the other LED strings. In particular, at the second instant $t_2$, the voltage $V_{in}$ exceeds the first threshold voltage $V_{th1}$.

In practice, if $I_{D1}$, $I_{D2}$, $I_{D3}$, $I_{D4}$ are the currents (shown in FIG. 7) that flow respectively in the MOSFETs M1, M2, M3, M4 of the first, second, third, and fourth regulation modules MREG1, MREG2, MREG3, MREG4, starting from the second instant $t_2$ there occurs an increase of just the current $I_{D1}$, which, as has been said, flows not only in the sensing resistor S1 of the first regulation module MREG1 and in the external resistor 12, but also in just the first LED string D1. The other currents $I_{D2}$, $I_{D3}$, $I_{D4}$ remain zero.

Once a short transient caused by the presence of the series resistances of the LEDs of the first LED string D1 has vanished, and more precisely starting from a third instant $t_3$, the first regulation module MREG1 operates in the regulation phase. The regulation phase entails the fact that the first operational amplifier K1 and the MOSFET M1 of the first regulation module MREG1 have exited from the respective saturation states, and that the MOSFET M1 operates in the linear region and causes a current to flow in the first LED string D1 that is proportional to the reference voltage $V_{ref}$.

In greater detail, after the third instant $t_3$, the first regulation module MREG1 operates in such a way that the first operational amplifier K1 maintains the voltage between its own positive input terminal (present on which is the reference voltage $V_{ref}$) and its own negative input terminal (present on which is the feedback voltage $V_{B1}$) zero. More in particular, the first operational amplifier K1, the differential amplifier Z1, the sensing resistor S1, the MOSFET M1, and the adder circuit including the second operational amplifier W1 form a closed control loop, in which the first operational amplifier K1 operates outside saturation, in such a way as to regulate in a linear way the current $I_{D1}$.

Yet in greater detail, since $g1\approx1$ and $g2\approx1$ and the sensing resistor S1 has a resistance that to a first approximation is negligible as compared to the resistance $R_{rext}$ of the external resistor 12, at the third instant $t_3$ the current $I_{D1}$ is substantially equal to the ratio between the voltage $V_{rext}$ and the resistance $R_{rext}$ of the external resistor 12. Further, since at the third instant $t_3$ the voltage $V_{rext}$ is approximately equal (in the aforementioned nominal conditions) to $k \cdot V_{th1}$, where k is the aforementioned division ratio introduced by the voltage divider 20, we have that the current $I_{D1}$ assumes a value $I_{D1\_t3}=k \cdot V_{th1}/R_{rext}$. For example, with k=0.0067, $V_{th1}=110$ V, and $R_{rext}=30\Omega$, we have that $I_{D1\_t3}$ is approximately 25 mA. In this connection, the curves shown in FIG. 7 are provided purely by way of example and refer to a hypothetical case, where $I_{D1\_t3}$ is approximately 25 mA.

Once again with reference to the third instant $t_3$, the currents in the second, third, and fourth LED strings D2, D3, D4 are zero because the voltage $V_{in}$ has not yet exceeded the sum of the first and second threshold voltages $V_{th1}$, $V_{th2}$, nor, much less, has it exceeded the sum of the first, second, and third threshold voltages $V_{th1}$, $V_{th2}$, $V_{th3}$ or the sum of the first, second, third, and fourth threshold voltages $V_{th1}$, $V_{th2}$, $V_{th3}$, $V_{th4}$.

In greater detail, prior to the third instant $t_3$, the current $I_{D1}$ exhibits a peak, due to the fact that, as explained previously, the MOSFET M1 is in saturation, before the first regulation module MREG1 enters the regulation phase. Further, before the regulation module MREG1 closes the aforementioned control loop, a time interval elapses, albeit of very limited duration. In what follows, said peak, as likewise the peaks that occur prior to entry into the regulation phase of the second, third, and fourth regulation modules MREG2, MREG3, MREG4 are not described further, in so far as they are irrelevant for the purposes of operation of the electronic driving circuit 10.

This being said, when the first regulation module MREG1 operates in the regulation phase, the current $I_{D1}$ follows a corresponding sinusoidal profile, as the voltage $V_{in}$ increases. There is thus a linear regulation of the current $I_{D1}$. In particular, the current $I_{D1}$ is substantially equal to $V_{ref}/R_{rext}$. Likewise, also the voltage $V_{M1}$ follows a corresponding sinusoidal profile; in particular, at the third instant $t_3$, the voltage $V_{M1}$ decreases down to a corresponding value $V_{M1\_t3}$, which depends upon the electrical characteristics of the aforementioned control loop, and then follows a respective sinusoidal profile.

In addition, when the first regulation module MREG1 operates in the regulation phase, the first operational amplifiers of the regulation modules downstream of the first regulation module MREG1, i.e., the first operational amplifiers K2, K3, K4 of the second, third, and fourth regulation modules MREG2, MREG3, MREG4 remain in saturation, as likewise the corresponding MOSFETs.

Following upon increase of the voltage $V_{in}$, at a subsequent fourth instant $t_4$, the second regulation module MREG2 enters the regulation phase.

In greater detail, at an instant $t_4-\delta$ (with $t_3<t_4-\delta<t_4$) we find that the voltage $V_{in}$ exceeds the sum of the first and second threshold voltages $V_{th1}$, $V_{th2}$, and consequently the current $I_{D2}$ starts to increase. Further, following upon the fourth instant $t_4$, the first operational amplifier K2 and the MOSFET M2 of the second regulation module MREG2 form a closed control loop that regulates the current $I_{D2}$. In particular, the MOSFET M2 of the second regulation module MREG2 operates in the linear region and causes flow in the second LED string D2 of a current proportional to the reference voltage $V_{ref}$; further, the first operational amplifier K2 maintains the voltage between its own positive input terminal (present on which is the reference voltage $V_{ref}$) and its own negative input terminal (present on which is the feedback voltage $V_{B2}$) zero.

In greater detail, at the fourth instant $t_4$ the current $I_{D2}$ assumes to a first approximation (in the aforementioned nominal conditions) a value $I_{D2\_t4}=(V_{th1}+V_{th2})/R_{rext}$. For example, with k=0.0067, $V_{th1}$=110 V, $V_{th2}$=78 V and $R_{rext}$=30Ω, $I_{D2\_t4}$ is approximately 42 mA.

Entry into regulation phase by the second regulation module MREG2 entails switching-off of the first regulation module MREG1; i.e., it entails opening of the control loop formed by the first regulation module MREG1. In practice, at the fourth instant $t_4$, the first operational amplifier K1 goes into negative saturation, since the voltage on the respective positive input terminal (equal to the reference voltage $V_{ref}$) becomes lower than the voltage present on the respective negative input terminal, for the reasons described hereinafter. In particular, assuming that the first operational amplifiers K1, K2, K3, K4 are of a unipolar type, the voltage $V_{M1}$ generated on the output of the first operational amplifier K1 becomes zero. Consequently, the MOSFET M1 of the first regulation module MREG1 is inhibited and operates as an open circuit. For this reason, following upon the fourth instant $t_4$, the current $I_{D2}$ flows in the first and second LED strings D1, D2, as well as in the MOSFET M2 and in the sensing resistor S2 of the second regulation module MREG2, but not in the MOSFET M1 and in the sensing resistor S1 of the first regulation module MREG1.

As regards the aforementioned switching-off of the first regulation module MREG1, this occurs given that g2>g1, and thus given that, in generating the feedback voltage $V_{B1}$, a weight is assigned to the feedback voltage $V_{B2}$ (and consequently to the detected voltage $V_{S2}$ of the second regulation module MREG2) that is greater than the weight assigned to the detected voltage $V_{S1}$ of the first regulation module MREG1. In other words, a gain is applied to the feedback voltage $V_{B2}$, and thus to the detected voltage $V_{S2}$ of the second regulation module MREG2, which causes an unbalancing of the voltages present on the input terminals of the first operational amplifier K1 of the first regulation module MREG1. In particular, on the positive input terminal of the first operational amplifier K1 of the first regulation module MREG1 the reference voltage $V_{ref}$ is still present, but the feedback voltage $V_{B1}$, present on the negative input terminal, becomes higher than the reference voltage $V_{ref}$.

In greater detail, as mentioned previously, the current $I_{D2}$, which is initially zero, starts to increase at the instant $t_4-\delta$. At the same time, the current $I_{D1}$ starts to drop with respect to the corresponding sinusoidal profile, down to zero at the fourth instant $t_4$, since the feedback voltage $V_{B1}$ of the first regulation module MREG1 depends also upon the detected voltage $V_{S2}$ of the second regulation module MREG2.

In practice, in a time interval that has duration equal to $\delta$ and that terminates with the fourth instant $t_4$, there is passage of current in both of the MOSFETs M1, M2 of the first and second regulation modules MREG1, MREG2, in such a way that passage between the phase in which regulation is carried out by the first regulation module MREG1 and the phase in which regulation is carried out by the second regulation module MREG2 occurs without any sharp discontinuity. In particular, in the aforementioned time interval, the first regulation module MREG1 is not yet off (it is outside the saturation region), but no longer regulates the current $I_{D1}$ so that the latter is proportional to the reference voltage $V_{ref}$. Equivalently, in the aforementioned time interval regulation of the current that as a whole flows in the cascade of the LED strings is assigned to co-operation between the first and second regulation modules MREG1, MREG2. More in particular, in the aforementioned time interval it is the sum of the currents $I_{D1}$ and $I_{D2}$ that is proportional to the reference voltage $V_{ref}$.

This being said, when the second regulation module MREG2 operates in the regulation phase, the current $I_{D2}$ and the voltage $V_{M2}$ follow corresponding sinusoidal profiles. In particular, the current $I_{D2}$ is substantially equal to $V_{ref}/R_{rext}$. Further, at the fourth instant $t_4$, the voltage $V_{M2}$ decreases from the aforementioned maximum value to a corresponding value $V_{M2\_t4}$. In addition, when the second regulation module MREG2 operates in the regulation phase, the first operational amplifiers K3, K4 of the third and fourth regulation modules MREG3, MREG4 remain in saturation, as likewise the corresponding MOSFETs.

Following upon the further increase in the voltage $V_{in}$, at a fifth instant $t_5$ there occur switching-off of the second regulation module MREG2 and entry into the regulation phase by the third regulation module MREG3; the first regulation module MREG1 remains off. The fifth instant $t_5$ is subsequent to overstepping, by the voltage $V_{in}$, of the sum of the first, second, and third threshold voltages $V_{th1}$, $V_{th2}$, $V_{th3}$.

Following upon the further increase in the voltage $V_{in}$, at a sixth instant $t_6$ there occur switching-off of the third regulation module MREG3 and entry into the regulation phase by the fourth regulation module MREG4; the first and second regulation modules MREG1, MREG2 remain off. The sixth instant $t_5$ is subsequent to overstepping, by the voltage $V_{in}$, of the sum of the first, second, third, and fourth threshold voltages $V_{th1}$, $V_{th2}$, $V_{th3}$, $V_{th4}$.

Once again with reference to FIG. 7, this shows, purely by way of example, also the evolution of the reference voltage $V_{ref}$ and of the feedback voltage $V_{B3}$ of the third regulation module MREG3. In practice, it may be noted how the feedback voltage $V_{B3}$ is lower than the reference voltage $V_{ref}$ until the fifth instant $t_5$, with consequent positive saturation of the first operational amplifier K3 of the third regulation module MREG3. Between the fifth and the sixth instants $t_5$, $t_6$, the feedback voltage $V_{B3}$ is equal to the reference voltage $V_{ref}$, since at the fifth instant $t_5$ the third regulation module MREG3 has entered the regulation phase. At the sixth instant $t_6$, the feedback voltage $V_{B3}$ exceeds the reference voltage $V_{ref}$. Thus, the third regulation module MREG3 turns off.

Following upon the sixth instant $t_6$, the voltage $V_{in}$ assumes a respective maximum value and then starts to decrease. In particular, at a seventh instant $t_7$, the voltage $V_{in}$ becomes lower than the sum of the first, second, third, and fourth threshold voltages $V_{th1}$, $V_{th2}$, $V_{th3}$, $V_{th4}$. Consequently, the current $I_{D4}$ vanishes.

In detail, the current $I_{D4}$ tends to drop prior to the seventh instant $t_7$, on account of the presence of the series resistances of the LEDs of the LED strings. This means that, at an instant $t_7-\varepsilon$, the fourth control module MREG4 exits from the regulation phase.

In greater detail, at the instant $t_7-\varepsilon$, the reference voltage $V_{ref}$ present on the positive input terminal of the first operational amplifier K4 becomes greater than the feedback voltage $V_{B4}$ present on the negative input terminal. Consequently, the first operational amplifier K4 of the fourth regulation module MREG4 goes into positive saturation. At the same time, the current $I_{D3}$ starts to increase. Further, since the contribution to the feedback voltage $V_{B3}$ of the third regulation module MREG3 due to the detected voltage $V_{S4}$ of the fourth regulation module MREG4 has vanished, the feedback voltage $V_{B3}$ equals the reference voltage $V_{ref}$. Consequently, at the seventh instant $t_7$, the third regulation module MREG3 returns into the regulation phase.

At a subsequent eighth instant $t_8$, the voltage $V_{in}$ becomes lower than the sum of the first, second, and third threshold voltages $V_{th1}$, $V_{th2}$, $V_{th3}$; consequently, the current $I_{D3}$ vanishes. Before the current $I_{D3}$ vanishes, the first operational amplifier K3 of the third regulation module MREG3 goes into positive saturation. Further, at the eighth instant $t_8$, the second regulation module MREG2 returns into the regulation phase.

Likewise, at a ninth instant $t_9$ the voltage $V_{in}$ becomes lower than the sum of the first and second threshold voltages $V_{th1}$, $V_{th2}$; consequently, the current $I_{D2}$ vanishes. Before the current $I_{D2}$ vanishes, the first operational amplifier K2 of the second regulation module MREG2 goes into positive saturation. Further, at the ninth instant $t_9$, the first regulation module MREG1 returns into the regulation phase.

Finally, at a tenth instant $t_{10}$, the voltage $V_{in}$ becomes lower than the first threshold voltage $V_{th1}$; consequently, the current $I_{D1}$ vanishes. Before the current $I_{D1}$ vanishes, the first operational amplifier K1 of the first regulation module MREG1 goes into positive saturation; thus, the first regulation module MREG1 exits from the regulation phase.

In practice, the present electronic driving circuit 10 comprises a plurality of regulation modules electrically connected in sequence, each of which electrically couples to the cathode terminal of a corresponding LED string. The regulation modules are configured to carry out in turn one current-regulation phase. Further, the current-regulation phases occur in a pre-set sequence, as a function of the plot of the reference voltage $V_{ref}$. In particular, when the amplitude of the reference voltage $V_{ref}$ is increasing, the first, second, third, and fourth regulation modules MREG1, MREG2, MREG3, MREG4 carry out the respective regulation phases in succession, i.e., in a first order. Instead, when the amplitude of the reference voltage $V_{ref}$ is decreasing, the first, second, third, and fourth regulation modules MREG1, MREG2, MREG3, MREG4 carry out the respective regulation phases in a second order, opposite to the first order. In addition, each regulation module is such that, when it operates in the current-regulation phase, it regulates the current that flows in the corresponding LED string and in the previous LED strings in such a way that said current is directly proportional to the reference voltage $V_{ref}$.

All this being said, there follows a detailed description of operation of the entire electronic driving circuit 10, i.e., where the aforementioned hypothesis as regards closing of the switch 19 and absence of the compensation module 17, of the fifth regulator REG5, of the fifth LED string D5, of the compensation capacitor 21, and of the compensation diode 23 has been removed.

In detail, since, as mentioned previously, the fifth LED string D5 is formed by a number of LEDs equal to the total number of LEDs of the first, second, third, and fourth LED strings D1, D2, D3, D4, it may be shown that the second terminal T2 of the external resistor 12 is set at a voltage $V_{MID}$, which exhibits variations in time, around a value approximately equal to $V_{inpk}/2$, where $V_{inpk}$ is the peak value of the voltage $V_{in}$.

In greater detail, assuming that the voltage $V_{in}$ is increasing after it has exhibited a respective zero, it is found that, as long as $V_{in}<V_C+V_{th1}$, the switch 19 is closed, and thus the second terminal T2 of the external resistor 12 is shorted with the second output terminal $O_2$ of the rectifier 4. Consequently, if by "ordinary portion" is meant the aforementioned portion of the electronic driving circuit 10 that includes the control module 16 and the first, second, third, and fourth regulators REG1, REG2, REG3, REG4, it may be shown that the ordinary portion operates according to what is described with reference to FIG. 7. In other words, the first, second, third, and fourth regulation modules MREG1, MREG2, MREG3, MREG4 enter in sequence the regulation phase; further, if $I_{Dx}$ is the current that at a generic instant enters the first terminal T1 of the external resistor 12, it flows towards the second output terminal $O_2$ of the rectifier 4, without flowing through the fifth LED string D5, on account of the presence of the compensation diode 23.

If by "compensation portion" is meant the portion of electronic driving circuit 10 including the first, second, third, fourth, and fifth gain stages Gx1, Gx2, Gx3, Gx4, Gx5, the filter 51, the first and second adder stages 53, 55, the subtractor stage 57, the first and second control resistors $R_{p1}$, $R_{p2}$, as well as the MOSFET M5, the differential amplifier Z5, the operational amplifier K5 and the sensing resistor S5 of the compensation module 17, it is found that said compensation portion operates in such a way as to reduce the variations of the luminous flux of the radiation emitted by the optoelectronic circuit 1.

In greater detail, as long as $V_{in}<V_C+V_{th1}$, the compensation capacitor 21 discharges through the sensing resistor S5 and the MOSFET M5 of the compensation module 17, and consequently also through the fifth LED string D5. In this connection, in fact, it is assumed that the resistance of the sensing resistor S5 is negligible as compared to the resistances of the first and second control resistors $R_{p1}$, $R_{p2}$. For example, the resistances of the first and second control resistors $R_{p1}$, $R_{p2}$ may be, respectively, 7.5 kΩ and 1.5 MΩ. As regards, instead, the resistance of the sensing resistor S5, it may be equal, for example, to the resistance of the external resistor 12, which, as has been said previously, is, for example, 30Ω. In this case, assuming for instance that the gains of the differential amplifiers of the first, second, third, and fourth regulation modules MREG1, MREG2, MREG3, MREG4 are equal to unity and that the corresponding sensing resistances are, as mentioned previously, 1Ω, the differential amplifier Z5 of the compensation module 17 may introduce a gain equal to 1/30. In fact, in regard to the compensation module 17, the sensing resistor S5 performs the functions of sensing resistor and external resistor; consequently, in order to estimate correctly the various contributions of luminous flux, it is possible equalize the gain introduced by the pair formed by the sensing resistor S5 and the differential amplifier Z5 with the gain introduced by one of the corresponding pairs of regulation modules, which are the same as one another.

Since the detected voltages $V_{S1}$, $V_{S2}$, $V_{S3}$, $V_{S4}$, $V_{S5}$ are proportional to the currents that flow in the MOSFETs M1, M2, M3, M4, M5, respectively, the sum of the amplified voltages $V_{A1}$, $V_{A2}$, $V_{A3}$, $V_{A4}$, $V_{A5}$ is directly proportional to the luminous flux emitted as a whole by the optoelectronic circuit 1, i.e., by the first, second, third, fourth, and fifth LED strings D1, D2, D3, D4 and D5. This result also derives from the fact that, when the current regulation is carried out by the n-th regulation module, the current flows both in the n-th LED string and in the previous LED strings; for this reason, the gains gx1, gx2, gx3, gx4, gx5, which are applied to the detected voltages $V_{S1}$, $V_{S2}$, $V_{S3}$, $V_{S4}$, $V_{S5}$, and thus to the corresponding currents, satisfy the following criterion: they are directly proportional, through a same factor of proportionality (which may be any), to the number of LEDs that are traversed by the corresponding current.

This being said, the first adder stage 53 generates a voltage $V_{Itot}$, which is directly proportional to the sum of the amplified voltages $V_{A1}$, $V_{A2}$, $V_{A3}$, $V_{A4}$, $V_{A5}$, and thus is directly proportional to the luminous flux emitted as a whole by the optoelectronic circuit 1.

The voltage $V_{Itot}$ is filtered by the filter 51, which generates a voltage $V_{Imed}$, directly proportional to the mean value of the luminous flux emitted as a whole by the optoelectronic circuit 1.

The subtractor stage 57 generates a voltage $V_{IA}$, equal to the difference between the voltage $V_{Itot}$ and the voltage $V_{Imed}$. The voltage $V_{IA}$ is thus directly proportional to the instantaneous deviation of the luminous flux emitted as a whole by the optoelectronic circuit 1 with respect to the mean value of said luminous flux.

The second adder stage 55 generates a voltage $V_{fb}$, which is directly proportional to the sum of the voltage $V_{IA}$ and a voltage $V_{N8}$, present on the eighth node $N_8$, which is directly proportional to the voltage present on the second terminal T2 of the external resistor 12.

In practice, the current that flows in the fifth LED string D5, and thus also the voltage present on the second terminal T2 of the external resistor 12, is regulated by means using a first control loop, which envisages generation of the voltage $V_{N8}$ and control of the voltage present on the gate terminal of the MOSFET M5 as a function of the voltage $V_{N8}$, and a second control loop, which envisages generation of the voltage $V_{IA}$ and control of the voltage present on the gate terminal of the MOSFET M5 as a function of the voltage $V_{IA}$.

In particular, the first control loop guarantees that the voltage $V_{MID}$ present on the second terminal T2 of the external resistor 12 will vary in time around a value approximately equal to $V_{inpk}/2$, thus preventing said voltage from assuming values that are too high or too low, which would cause, respectively, failure to switch on of one or more of the LED strings D1, D2, D3, D4 and the impossibility of switching on the LED string D5. The second control loop renders, instead, the luminous flux emitted as a whole by the optoelectronic circuit 1 practically constant, limiting the variations thereof (i.e., minimizing the variations of the luminous flux, compatibly with operation of the first control loop), thus considerably reducing the light flicker. The weights with which the voltages $V_{IA}$ and $V_{N8}$ are generated, starting respectively from the voltage $V_{MID}$ and from the ensemble of the detected voltages $V_{S1}$-$V_{S5}$, are such that the first control loop is dominant with respect to the second control loop; consequently, the reduction of light flicker is obtained after the optoelectronic circuit 1 has reached a respective stable working point.

When $V_{in} > V_C + V_{th1}$, the switch 19 is opened. In this connection, it may be noted how the switch 19, as likewise the MOSFET M5 of the compensation module 17, may be formed, for example, by a P-channel enrichment MOSFET. It may here be pointed out how the structure of the estimator circuit 59 is irrelevant for the purposes of operation of the optoelectronic circuit 1. For example, albeit not shown, the estimator circuit 59 may be electrically coupled to the first output terminal $O_1$ of the rectifier 4, to the output of the differential amplifier Z1 of the first regulation module MREG1, and to the second terminal T2 of the external resistor 12; further, the estimator circuit 59 may be configured to sample the voltage $V_{in}$ when the voltage $V_{S2}$ is other than zero (i.e., when the voltage $V_{in}$ is approximately equal to the first threshold voltage $V_{th1}$), to add the value sampled to the voltage present on the second terminal T2 of the external resistor 12, and then to apply the aforementioned reduction factor.

Once again with reference to the moment when $V_{in} > V_C + V_{th1}$, at this instant the switch 19 opens.

As shown in greater detail in FIG. 2, if $V_{po}$ is the voltage between the first output terminal $O_1$ of the rectifier 4 and the second terminal T2 of the external resistor 12, immediately prior to opening of the switch 19 said voltage $V_{po}$ is equal to $V_C + V_{th1}$; following upon opening of the switch 19, the voltage $V_{po}$ assumes a value equal to $V_{in} - V_C$ (equal to $V_{th1}$), and thus undergoes a sensible reduction. Notwithstanding the reduction, the voltage $V_{in}$ has by now achieved a value such as to enable in any case regulation of the current by the first regulation module MREG1.

Yet in greater detail, immediately prior to opening of the switch 19, the fourth regulation module MREG4 regulates the current that flows in the first, second, third, and fourth LED strings D1, D2, D3, D4, which is directly proportional to the voltage $V_{in}$. Following upon opening of the switch 19, regulation is entrusted to the first regulation module MREG1, whereas the current flows only in the first LED string D1 and continues to be directly proportional to the voltage $V_{in}$; next, the further increase in the voltage $V_{in}$ again leads to entry into the regulation phase, in succession, of the second, third, and fourth regulation modules MREG2, MREG3, MREG4. In other words, for each step in which the voltage $V_{in}$ is (for example) increasing, each regulation module carries out two regulation phases. In this way, an improvement of the power factor (PF) and of the total harmonic distortion (THD) is guaranteed, since the current follows the voltage $V_{in}$ more closely.

During the time interval when $V_{in} > V_C + V_{th1}$, the compensation capacitor 21 can recharge, since the current that flows in the fifth LED string D5 is lower than when $V_{in} < V_C + V_{th1}$, because the first, second, third, and fourth LED strings D1, D2, D3, D4 are fully conducting and provide a greater contribution to the overall luminous flux of the optoelectronic circuit 1.

Figure 8:
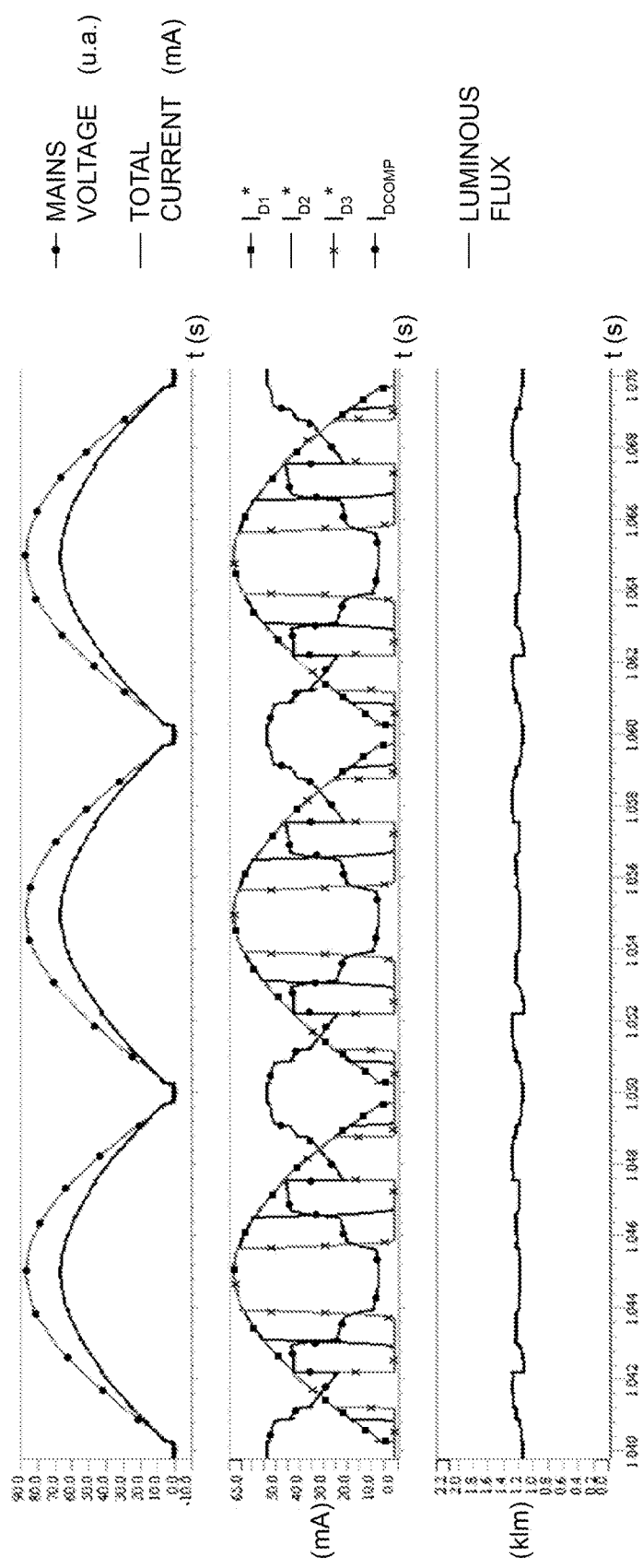
FIG. 8 shows examples of time plots of currents generated in one embodiment (not shown), of the present driving circuit, as well as time plots of a grid voltage, of a total current that flows in said embodiment, and of an emitted luminous flux.

FIG. 8 regards a possible embodiment (not shown), in which the fourth regulation module MREG4 is absent. Further, FIG. 8 shows, purely by way of example, the time plots of the currents $I_{D1}^*$, $I_{D2}^*$, $I_{D3}^*$ that flow respectively in the first, second, and third LED strings D1, D2, D3, as well as the current $I_{DCOMP}$ that flows in the fifth LED string D5; in addition, FIG. 8 shows the plots of the grid voltage, of the total current that enters the anode of the first LED string D1, and of the luminous flux emitted as a whole by the optoelectronic circuit 1.

In practice, the embodiment described previously envisages control of the fifth LED string D5 in a way complementary with respect to the first, second, third, and fourth LED strings D1, D2, D3, D4, and as a function of the luminous flux emitted as a whole by the optoelectronic circuit 1, which to a first approximation no longer depends upon the evolution of the grid voltage. In other words, the fifth LED string D5 is driven in phase opposition with respect to the first, second, third, and fourth LED strings D1, D2, D3, D4 so as to reduce the light flicker.

In yet other words, the compensation capacitor 21 can function as energy-storage element, when $V_{in} > V_C + V_{th1}$; instead, when $V_{in} < V_C + V_{th1}$, the charge stored by the compensation capacitor 21 is yielded in order to control the fifth LED string D5 for counterbalancing variations of the luminous flux emitted by the first, second, third, and fourth LED strings D1, D2, D3, D4.

In addition, the electronic driving circuit 10 operates in such a way that the charge supplied to the compensation capacitor 21, when $V_{in} > V_C + V_{th1}$, is equal to the charge that flows through the fifth LED string D5, when $V_{in} < V_C + V_{th1}$.

Albeit not shown, further possible are embodiments of the type described with reference to FIGS. 2 and 6, but in which the switch 19, the comparator 18, and the estimator circuit 59 are absent. Operation of these embodiments is substantially the same as what has been described previously. However, these solutions have a lower performance as regards power factor and total harmonic distortion. In fact, conduction of the first, second, third, and fourth LED strings D1, D2, D3, D4 is possible only when $V_{in} > V_C + V_{th1}$; this means that, for each half-cycle of the grid voltage, the current that flows in the LED strings will remain zero for a non-negligible time.

Figure 9:
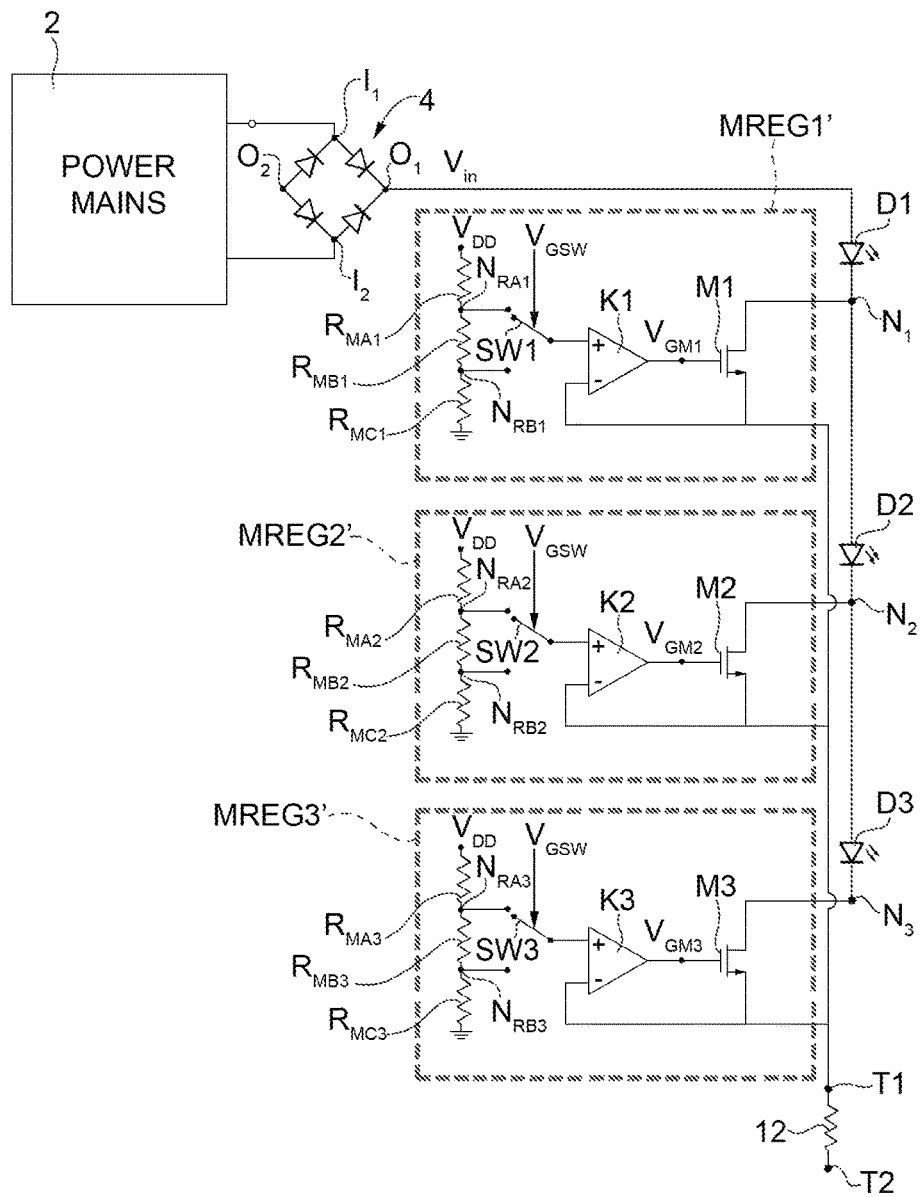
FIGS. 9 and 10 are respective circuit diagrams of a first part and a second part of a further embodiment of the present driving circuit.
Figure 10:
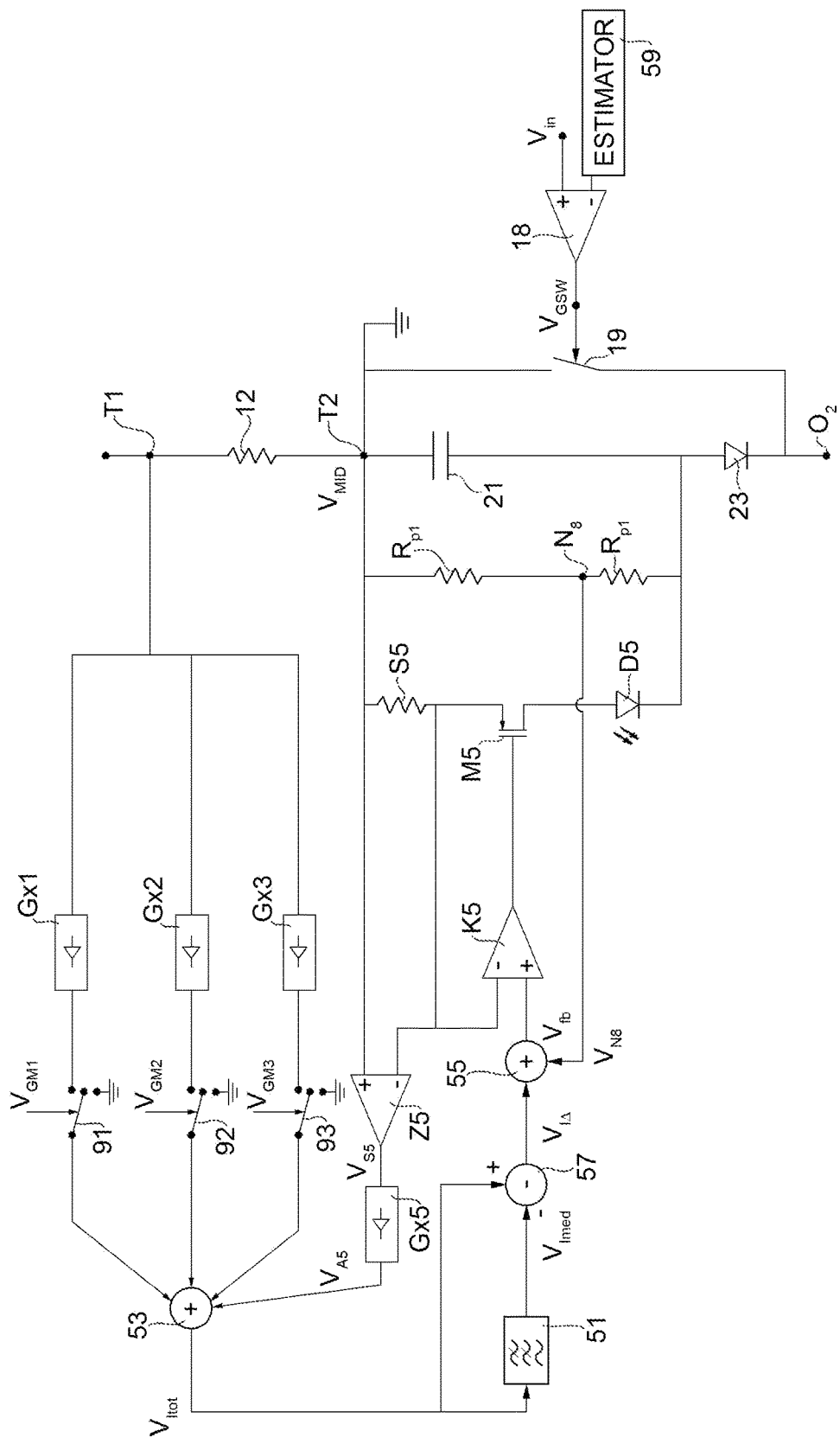

FIGS. 9 and 10 show a different embodiment, which is now described with reference to the differences with respect to the embodiment shown in FIGS. 2 and 6. Electronic components and voltages already present in the embodiment shown in FIGS. 2 and 6 are denoted by the same terms and the same references, except where otherwise specified.

In detail, as shown in FIG. 9 and without any loss of generality, the fourth regulation module MREG4 is absent. Further, with reference to the first regulation module, here designated by MREG1', it once again includes the first operational amplifier K1 and the MOSFET M1, which is driven by the first operational amplifier K1; in addition, the first regulation module MREG1' comprises a respective switch SW1 and a first resistor $R_{MA1}$, a second resistor $R_{MB1}$, and a third resistor $R_{MC1}$, which will be referred to in what follows as the first, second, and third regulation resistors $R_{MA1}$, $R_{MB1}$, $R_{MC1}$, respectively. In greater detail, a first terminal of the first regulation resistor $R_{MA1}$ is set at a reference voltage $V_{DD}$, which is for example 3.3 V. The second terminal of the first regulation resistor $R_{MA1}$ is connected to a first terminal of the second regulation resistor $R_{MB1}$, with which it forms a node $N_{RA1}$, which will be referred to as the first regulation node $N_{RA1}$. The second terminal of the second regulation resistor $R_{MB1}$ is connected to a first terminal of the third regulation resistor $R_{MC1}$, with which it forms a node $N_{RB1}$, which will be referred to as the second regulation node $N_{RB1}$; the second terminal of the third regulation resistor $R_{MC1}$ is connected to ground.

The source terminal of the MOSFET M1 is connected to the negative input of the first operational amplifier K1 and to the first terminal T1 of the external resistor 12.

The switch SW1 is pre-arranged for connecting the positive input of the first operational amplifier K1 alternatively to the first regulation node $N_{RA1}$ or to the second regulation node $N_{RB1}$, as a function of a voltage $V_{GSW}$, which is present on the output of the comparator 18. More in particular, the switch SW1 connects the positive input of the first operational amplifier K1 respectively to the second regulation node $N_{RB1}$, when $V_{in} < V_C + V_{th1}$, and to the first regulation node $N_{RA1}$, when $V_{in} > V + V_{th1}$.

Once again with reference to FIG. 9, the second and third regulation modules (here designated by MREG2' and MREG3') are the same as the first regulation module MREG1', but for the differences described hereinafter; further, given any one of the second and third regulation modules MREG2', MREG3', the respective electronic components and the voltages generated are denoted by the same terms used for the corresponding electronic components/voltages of the first regulation module MREG1', as well as by the same references, but for the fact that, given any component or voltage of the n-th regulation module, the corresponding reference ends with the number 'n', instead of with the number '1'.

In detail, the switch SW2 of the second regulation module MREG2' is controlled by the voltage $V_{GSW}$ and operates in such a way as to connect the positive input of the first operational amplifier K2 of the second regulation module MREG2' to the second regulation node $N_{RB2}$ of the second regulation module MREG2', when $V_{in} < V_C + V_{th1}$, and to the first regulation node $N_{RA2}$ of the second regulation module MREG2', when $V_{in} > V_C + V_{th1}$.

The switch SW3 of the third regulation module MREG3' is controlled via the voltage $V_{GSW}$ and operates in such a way as to connect the positive input of the first operational amplifier K3 of the third regulation module MREG3' to the second regulation node $N_{RB3}$ of the third regulation module MREG3', when $V_{in} < V_C + V_{th1}$, and to the first regulation node $N_{RA3}$ of the third regulation module MREG3', when $V_{in} > V_C + V_{th1}$.

The first, second, and third regulation resistors $R_{MA1}$, $R_{MB1}$, $R_{MC1}$ of the first regulation module MREG1' have values of resistance of, for example, 8800Ω, 1200Ω, and 6923Ω, respectively.

The first, second, and third regulation resistors $R_{MA2}$, $R_{MB2}$, $R_{MC2}$ of the second regulation module MREG2' have values of resistance such that the first regulation node $N_{RA2}$ of the second regulation module MREG2' is at a voltage higher than the voltage of the second regulation node $N_{RB1}$ of the first regulation module MREG1'. For example, the first, second, and third regulation resistors $R_{MA2}$, $R_{MB2}$, $R_{MC2}$ of the second regulation module MREG2' have values of resistance of, for example, 7700Ω, 2300Ω, and 8333Ω, respectively.

The first, second, and third regulation resistors $R_{MA3}$, $R_{MB3}$, $R_{MC3}$ of the third regulation module MREG3' have values of resistance such that the first regulation node $N_{RA3}$ of the third regulation module MREG3' is at a voltage higher than the voltage of the second regulation node $N_{RB2}$ of the second regulation module MREG2'. For example, the first, second, and third regulation resistors $R_{MA3}$, $R_{MB3}$, $R_{MC3}$ of the third regulation module MREG3' have values of resistance of, for example, 6500Ω, 3500Ω and 9500Ω, respectively.

In practice, the first, second, and third regulation modules MREG1', MREG2' and MREG3' operate in sequence, regulating the current in a discrete way, instead of a continuous way, as described in greater detail hereinafter.

As regards the compensation portion of the electronic driving circuit 10, it is shown in FIG. 10 and is now described with reference only to the differences with respect to what is shown in FIG. 6.

In detail, the fourth gain circuit Gx4 is absent; further, the inputs of the first, second, and third gain circuits Gx1, Gx2, Gx3 are connected to the first terminal T1 of the external resistor 12. By way of example, the gains of the first, second, and third gain circuits Gx1, Gx2, Gx3 are gx1=1, gx2=2, gx3=3, respectively. Further, it is assumed that the fifth LED string D5 is formed by a number of LEDs equal to 3·NUM, i.e., is equal to the total number of LEDs of the first, second, and third LED strings D1, D2, D3; it is further assumed that the gain gx5 of the fifth gain circuit Gx5 is equal to 3.

Arranged between the first gain circuit Gx1 and the first adder stage 53 is a switch 91, controlled by the voltage generated by the first operational amplifier K1 of the first regulation module MREG1', designated by $V_{GM1}$. The switch 91 connects a corresponding input of the first adder stage 53 alternatively to the output of the first gain circuit Gx1, if the first regulation module MREG1' operates in regulation mode, or else to ground, otherwise. In this connection, considering any one of the regulation modules, it is found that, prior to entry into the regulation phase, the respective first operational amplifier is in saturation, and thus supplies a voltage close to its own supply voltage; when the regulation module is in the regulation phase, the respective first operational amplifier operates outside saturation, and thus supplies a voltage intermediate between its own supply voltage and a zero voltage (on the hypothesis of unipolar supply); finally, when the subsequent regulation module enters the regulation phase, the first operational amplifier goes into negative saturation, and thus supplies a zero voltage.

Arranged between the second gain circuit Gx2 and the first adder stage 53 is a switch 92, controlled by the voltage generated by the first operational amplifier K2 of the second regulation module MREG2', designated by $V_{GM2}$. The switch 92 connects a corresponding input of the first adder stage 53 alternatively to the output of the second gain circuit Gx2, if the second regulation module MREG2' operates in regulation mode, or else to ground, otherwise.

Arranged between the third gain circuit Gx3 and the first adder stage 53 is a switch 93, controlled by the voltage generated by the first operational amplifier K3 of the third regulation module MREG3', designated by $V_{GM3}$. The switch 93 connects a corresponding input of the first adder stage 53 alternatively to the output of the third gain circuit Gx3, if the third regulation module MREG3' operates in regulation mode, or else to ground, otherwise.

In practice, the voltage $V_{Itot}$ is still directly proportional to the luminous flux emitted as a whole by the optoelectronic circuit 1; consequently, the mechanism of compensation of the luminous flux implemented by the embodiment shown in FIGS. 9 and 10 is similar to the one implemented by the embodiment shown in FIGS. 2 and 6.

Figure 11:
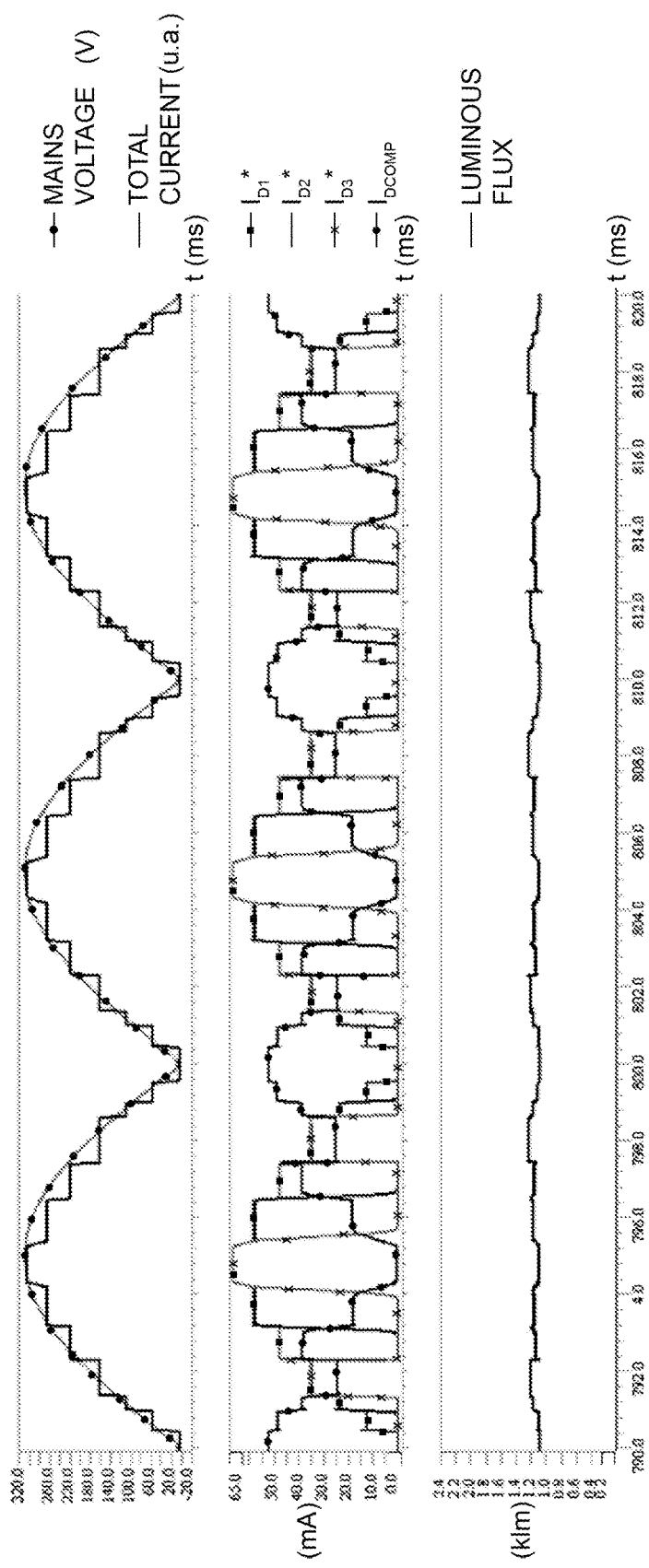
FIG. 11 shows examples of time plots of currents generated in an embodiment of the type shown in FIGS. 9 and 10, as well as time plots of a grid voltage, of a total current that flows in said embodiment, and of a luminous flux emitted.

FIG. 11 shows, purely by way of example, the time plots of the currents $I_{D1}^*$, $I_{D2}^*$ and $I_{D3}^*$ that flow in the first, second, and third LED strings D1, D2, D3, respectively, of the embodiment shown in FIGS. 9 and 10, as well as the current $I_{DCOMP}$ that flows in the fifth LED string D5; in addition, FIG. 11 shows the plots of the grid voltage, of the total current that enters the anode of the first LED string D1, and of the luminous flux emitted as a whole by the opto-electronic circuit.

As mentioned previously, the total current follows a stepwise plot. However, thanks to the use of the switch 19 and of the switches SW1, SW2, SW3 of the regulation modules, in each step in which the voltage $V_{in}$ is (for example) increasing, each regulation module carries out two regulation phases, with consequent improvement of the power factor and of the total harmonic distortion.

By what has been described and illustrated previously, the advantages that the present solution affords emerge clearly.

In particular, the present driving circuit enables reduction of light flicker, without penalizing the power factor and harmonic distortion, and without the need for use of additional sensors.

Furthermore, the present driving circuit makes use of a capacitor with reduced capacitance and implements an adaptive compensation of the total luminous flux.

In conclusion, it is clear that modifications and variations may be made to what has been described and illustrated herein, without thereby departing from the scope of the present invention, as defined in the annexed claims.

For example, the peak detector 22 may be of a type different from the one described. In general, the reference generator 14 may be different from what has been described; for example, it may include just the voltage divider 20, in which case the reference voltage $V_{ref}$ does not have a normalized amplitude.

As regards the normalization circuit 33, it may be absent, or else, if present, it may be formed in a per se known manner and may possibly perform, for example, also the function of the multiplier 26.

The transistors may be of a type different from what has been described. Further, also the circuit diagram that enables, within a regulation module, weighting in a different way of the detected voltage and the feedback voltage of the subsequent module, may be different. On the other hand, instead of the detected voltage it is possible to generate any quantity indicating the current that flows in the corresponding MOSFET.

The differential amplifier of each regulation module may amplify the voltage drop on the corresponding sensing resistor with a gain other than unity.

The values of the quantities mentioned in the present description may differ from the values given by way of example previously.

In addition, the number of regulation modules may be different from what has been described. It is further possible for one or more of the regulation modules to include circuit components different from the ones described. For example, it is possible that a low-pass filter and/or a buffer are present between the first operational amplifier and the MOSFET, in order to stabilize the electronic driving circuit. Further, the functions of the adder circuit and of the differential amplifier may be performed by using of a circuit diagram with a single amplifier. Once again, between the first output terminal $O_1$ of the rectifier 4 and ground there may be connected a capacitor (not shown) with a capacitance of, for example, 10 nF, in order to enable a further filtering effect on the current at input to the cascade of LED strings.

One or more of the LED strings may include two respective branches in parallel, each branch being formed by a corresponding LED string. In this case, the threshold voltages of the two branches may be the same as one another in order to enable correct turning-on of both of the branches.

The number of LEDs of each LED string may be any; further, the gains of the gain circuits are adapted accordingly for estimating correctly the luminous flux emitted by the optoelectronic circuit.

More in general, albeit not shown, embodiments are possible in which the aforementioned first and second control loops are different from what has been described previously, albeit continuing to envisage generation of electrical quantities indicating the total luminous flux and the voltage present on the second terminal of the external resistor.

In addition, embodiments are possible of the type shown in FIGS. 9 and 10, but in which the switch 19, the comparator 18, and the estimator circuit 59 are absent.

Finally, the electronic driving circuit 10 may form an electronic circuit of an integrated type; i.e., it may be integrated in one or more dice of semiconductor material. In this case, the reference generator 14 may be external with respect to the dice. Albeit not shown, and purely by way of example, the control module 17 and the first, second, third, and fourth regulators REG1, REG2, REG3, REG4 may be integrated in the first die. In other words, with reference for example to the embodiment shown in FIGS. 2 and 6, the first, second, third, and fourth regulation modules MREG1, MREG2, MREG3, MREG4 may be formed in the first die. The compensation module 17, the fifth regulator REG5, the comparator 18, and the switch 19 may be formed in the second die.

The invention claimed is:

1. An electronic circuit, comprising:
  a regulator circuit configured to regulate current flowing in a compensation LED string;
  current sensing circuitry configured to generate first output signals that are indicative of current flowing in each LED string of a plurality of LED strings cascaded to one another and generate a second output signal indicative of current flowing in the compensation LED string;
  a summation circuit configured to sum said first and second output signals and generate a sum signal;
  a difference circuit configured to detect change in said sum signal and generate a difference signal;
  wherein said regulator circuit includes an amplifier circuit configured to regulate current flowing in the compensation LED string in response to a difference between the second output signal and the difference signal.

2. The electronic circuit of claim 1, wherein the plurality of LED strings cascaded to one another are coupled to a first intermediate node and the compensation LED string is coupled between the first intermediate node and a second intermediate node.

3. The electronic circuit of claim 2, further comprising a capacitor coupled between the first and second intermediate nodes.

4. The electronic circuit of claim 3, further comprising a diode coupled between the second intermediate node and a supply node.

5. The electronic circuit of claim 4, wherein the regulator circuit operates to control discharge of the capacitor through the compensation LED string.

6. The electronic circuit of claim 4, further comprising:
  a MOSFET switch coupled between the first intermediate node and the supply node; and
  a control circuit configured to compare an input supply voltage applied to said plurality of LED strings cascaded to one another to reference voltage and control switching of said MOSFET switch in response to the comparison.

7. The electronic circuit of claim 6, wherein the control circuit operates to:
  actuate the MOSFET switch to enable a discharge of the capacitor through the compensation LED string when the input supply voltage is lower than the reference voltage; and
  deactuate the MOSFET switch to enable charging of the capacitor by at least a portion of the current that flows through the plurality of LED strings cascaded to one another when the input supply voltage is higher than the reference voltage.

8. The electronic circuit according to claim 7, wherein said reference voltage is proportional to a sum of a voltage drop on the capacitor and a threshold voltage of a least one LED string in the plurality of LED strings cascaded to one another.

9. The electronic circuit of claim 2, further comprising a voltage divider circuit coupled between the first and second intermediate nodes, said voltage divider circuit having a tap node generating a divided signal, and wherein said amplifier circuit is further configured to regulate current flowing in the compensation LED string in response to a difference between the second output signal and a sum of the divided signal and difference signal.

10. The electronic circuit of claim 2 wherein the first intermediate node is connected to a ground reference node.

11. The electronic circuit of claim 10, further comprising a resistor connected between a cathode terminal of the plurality of LED strings cascaded to one another and the first intermediate node.

12. The electronic circuit of claim 1, wherein the difference circuit comprises:
  a low pass filter configured to filter the sum signal and generate a filtered signal; and
  a subtraction circuit configured to subtract the filtered signal from the sum signal to generate the difference signal.

13. The electronic circuit of claim 1, wherein said regulator circuit further includes:
  a MOSFET device having a source-drain path;
  a sense resistor coupled in series with the source-drain path; and
  wherein said compensation LED string is coupled in series with the source-drain path.

14. The electronic circuit of claim 13, wherein the MOSFET device is a p-channel device, and wherein a source terminal of said p-channel device is connected to the sense resistor and to a first input of the amplifier circuit.

15. The electronic circuit of claim 1, wherein the difference signal is indicative of variation in the sum signal with respect to a corresponding mean value.

16. An electronic circuit, comprising:
  a drive circuit configured to drive a plurality of LED strings cascaded to one another;
  a resistor coupled between a first intermediate node and a cathode of the plurality of LED strings cascaded to one another;
  a capacitor coupled between the first intermediate node and a second intermediate node, said capacitor configured to be charged through at least a portion of a current that flows in the resistor;
  a diode coupled between the second intermediate node and a supply node;
  a compensation regulator configured to regulate current flow through a compensation LED string that is coupled between the first and second intermediate nodes to discharge said capacitor in response to a first electrical signal; and a generator circuit configured to generate the first electrical signal as function of current flow in each LED string of said plurality of LED strings and current flow in said compensation LED string.

17. The electronic circuit of claim 16, wherein the generator circuit comprises:
   current sensing circuitry configured to generate first output signals that are indicative of current flowing in each LED string of said plurality of LED strings cascaded to one another and generate a second output signal indicative of current flowing in the compensation LED string;
   a first summation circuit configured to sum said first and second output signals and generate a sum signal; and
   a difference circuit configured to detect change in said sum signal and generate a difference signal that is at least a first component of said first electrical signal.

18. The electronic circuit of claim 17, wherein the generator further comprises:
   a circuit configured to generate a voltage signal indicative of a voltage drop on the capacitor; and
   a second summation circuit configured to generate said first electrical signal by summing the difference signal and the voltage signal.

19. The electronic circuit of claim 16, wherein the compensation regulator comprises: a transistor coupled in series with compensation LED string; and wherein the compensation regulator is further configured to regulate current flow through the compensation LED string in response to a difference between the first electrical signal and a second electrical signal indicative of a voltage at a terminal of said transistor.

20. The electronic circuit of claim 16, further comprising a switch that is:
   actuated to enable discharging of the capacitor through the compensation LED string; and
   deactuated to enable charging of the capacitor by said portion of the current that flows in the resistor.

21. The electronic circuit of claim 20, further comprising a control circuit configured to actuate the switch when a supply voltage for said plurality of LED strings cascaded to one another exceeds a threshold and otherwise deactuate the switch.

22. The electronic circuit of claim 21, wherein the threshold is a voltage equal to a voltage drop on the capacitor and a threshold voltage of one LED string in said plurality of LED strings cascaded to one another.

* * * * *

UNITED STATES PATENT AND TRADEMARK OFFICE
CERTIFICATE OF CORRECTION

PATENT NO. : 10,129,942 B2
APPLICATION NO. : 15/830788
DATED : November 13, 2018
INVENTOR(S) : Davide Lena et al.

It is certified that error appears in the above-identified patent and that said Letters Patent is hereby corrected as shown below:

On the Title Page

Please add the following paragraph:
(30) Foreign Application Priority Data
Dec. 31, 2015 (IT) .................... 102015000089452
Apr. 29, 2016 (IT) .................... 102016000044285

In the Specification

At Column 4, Line 20, please replace [[ $R_{text}$, ]] with -- $R_{rext}$, --.
At Column 4, Line 55, please replace [[ 15 g ]] with -- 15 μF --.
At Column 5, Line 22, please replace [[ $V_1$ ]] with -- $V_{in}$ --.
At Column 5, Line 23, please replace [[ $V_1$ ]] with -- $V_{in}$ --.
At Column 8, Line 52, please replace [[ Si ]] with -- S1 --.
At Column 13, Line 33, please replace the equation [[ $I_{D2\_t4} = (V_{th1}+V_{th2})/R_{rext}$ ]]
with the equation -- $I_{D2\_t4} = k \cdot (V_{th1}+V_{th2})/R_{rext}$ --.
At Column 20, Line 12, please replace the equation [[ $V_{in} > V + V_{th1}$ ]]
with the equation -- $V_{in} > V_C + V_{th1}$ --.

Signed and Sealed this
Second Day of April, 2019

Andrei Iancu
*Director of the United States Patent and Trademark Office*